US009882684B2

(12) United States Patent
Gauvreau et al.

(10) Patent No.: US 9,882,684 B2
(45) Date of Patent: Jan. 30, 2018

(54) METHOD AND APPARATUS FOR OPERATING SUPPLEMENTARY CELLS IN LICENSED EXEMPT SPECTRUM

(71) Applicant: InterDigital Patent Holdings, Inc., Wilmington, DE (US)

(72) Inventors: Jean-Louis Gauvreau, La Prairie (CA); Martino M. Freda, Laval (CA); Zinan Lin, Basking Ridge, NJ (US); Joseph M. Murray, Schwenksville, PA (US); Chunxuan Ye, San Diego, CA (US); Erdem Bala, East Meadow, NY (US); Mihaela C. Beluri, Jericho, NY (US); Douglas R. Castor, Norristown, PA (US); Amith V. Chincholi, Sunnyvale, CA (US); Angelo A. Cuffaro, Laval (CA); Yuying Dai, Brossard (CA); Alpaslan Demir, East Meadow, NY (US); Joseph Gredone, Chalfont, PA (US); Rui Yang, Greenlawn, NY (US); Liangping Ma, San Diego, CA (US); Rocco Di Girolamo, Laval (CA); Debashish Purkayastha, Collegeville, PA (US); Athmane Touag, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/219,179

(22) Filed: Jul. 25, 2016

(65) Prior Publication Data
US 2016/0337090 A1   Nov. 17, 2016

Related U.S. Application Data

(63) Continuation of application No. 13/984,180, filed as application No. PCT/US2012/024079 on Feb. 7, 2012, now Pat. No. 9,419,776.
(Continued)

(51) Int. Cl.
*H04J 3/00* (2006.01)
*H04L 1/18* (2006.01)
(Continued)

(52) U.S. Cl.
CPC .......... *H04L 1/1893* (2013.01); *H04L 5/0032* (2013.01); *H04L 5/0055* (2013.01);
(Continued)

(58) Field of Classification Search
CPC .......... H04W 16/14; H04W 72/08; H04L 5/06
See application file for complete search history.

(56) References Cited

U.S. PATENT DOCUMENTS 7,400,903 B2 * 7/2008 Shoemake ............ H04W 72/02
455/450
2002/0177444 A1 * 11/2002 Nagato ............. H04M 15/8044
455/446
(Continued)

FOREIGN PATENT DOCUMENTS

| CN | 1578525 A | 2/2005 |
| CN | 1753564 A | 3/2006 |

(Continued)

OTHER PUBLICATIONS

European Telecommunicaitons Standards Institute, "Reconfigurable Radio Systems (RRS); Use cases for Opertation in White Space Frequency Bands, " Draft ETSI TR 102 907 V0.0.9 (Jan. 2011).*
(Continued)

*Primary Examiner* — Afshawn Towfighi
(74) *Attorney, Agent, or Firm* — Condo Roccia Koptiw LLP

(57) ABSTRACT

A method and apparatus for operating supplementary cells in licensed exempt (LE) spectrum. An aggregating cell operating in a frequency division duplex (FDD) licensed spectrum is aggregated with a LE supplementary cell operating
(Continued)

US 9,882,684 B2

Page 2 in a time sharing mode for uplink (UL) and downlink (DL) operations. The LE supplementary cell may be an FDD supplementary cell dynamically configurable between an UL only mode, a DL only mode, and a shared mode, to match requested UL and DL traffic ratios. The LE supplementary cell may be a time division duplex (TDD) supplementary cell. The TDD supplementary cell may be dynamically configurable between multiple TDD configurations. A coexistence capability for coordinating operations between the LE supplementary cell with other systems operating in the same channel is provided. Coexistence gaps are provided to measure primary/secondary user usage and permit other systems operating in the LE supplementary cell channel to access the channel.

26 Claims, 18 Drawing Sheets

Related U.S. Application Data

(60) Provisional application No. 61/440,288, filed on Feb. 7, 2011, provisional application No. 61/560,571, filed on Nov. 16, 2011.

(51) Int. Cl.

| | | |
|---|---|---|
| *H04W 16/24* | (2009.01) | |
| *H04L 5/06* | (2006.01) | |
| *H04L 5/14* | (2006.01) | |
| *H04L 5/00* | (2006.01) | |
| H04W 16/14 | (2009.01) | |
| H04W 28/16 | (2009.01) | |
| H04W 72/04 | (2009.01) | |
| H04W 72/08 | (2009.01) | |

(52) U.S. Cl.
CPC ............. *H04L 5/06* (2013.01); *H04L 5/14* (2013.01); *H04L 5/143* (2013.01); *H04L 5/1469* (2013.01); *H04W 16/24* (2013.01); H04L 1/1812 (2013.01); H04L 1/1861 (2013.01); H04W 16/14 (2013.01); H04W 28/16 (2013.01); H04W 72/0453 (2013.01); H04W 72/082 (2013.01)

(56) References Cited

U.S. PATENT DOCUMENTS

| | | | |
|---|---|---|---|
| 2006/0063533 A1* | 3/2006 | Matoba | H04L 5/0005 455/452.2 |
| 2008/0130519 A1 | 6/2008 | Bahl et al. | |
| 2010/0023831 A1* | 1/2010 | Kim | H04L 1/1671 714/748 |
| 2010/0234037 A1* | 9/2010 | Terry | H04L 1/0023 455/450 |
| 2010/0315962 A1* | 12/2010 | Imai | H04B 7/2615 370/252 |
| 2011/0013581 A1 | 1/2011 | Lee et al. | |
| 2011/0200032 A1* | 8/2011 | Lindstrom | H04W 56/0045 370/350 |
| 2011/0216676 A1 | 9/2011 | Li et al. | |
| 2012/0039279 A1 | 2/2012 | Chen et al. | |
| 2016/0262136 A1 | 9/2016 | Nakao et al. | |

FOREIGN PATENT DOCUMENTS

| | | |
|---|---|---|
| GB | 2477649 A | 8/2011 |
| JP | 2011-517515 A | 6/2011 |
| JP | 2012-512550 A | 5/2012 |
| JP | 2012-516108 A | 7/2012 |
| JP | 2012-521729 A | 9/2012 |
| JP | 2013-500674 A | 1/2013 |
| JP | 2015-144455 A | 8/2015 |
| WO | WO 2009/046668 A1 | 4/2009 |
| WO | WO 2010/051780 A1 | 5/2010 |
| WO | WO 2010/069422 A1 | 6/2010 |
| WO | WO 2010/074490 A2 | 7/2010 |
| WO | WO 2010/085264 A1 | 7/2010 |
| WO | WO 2010/096422 A1 | 8/2010 |
| WO | WO 2010/097722 A1 | 9/2010 |
| WO | WO 2010/111150 A2 | 9/2010 |
| WO | WO 2010/122783 A1 | 10/2010 |
| WO | WO 2010/129295 A1 | 11/2010 |
| WO | WO 2011/014002 A2 | 2/2011 |

OTHER PUBLICATIONS

3rd Generation Partnership Project (3GPP), RP-100643, "LS on UMTS/LTE 3500 MHz", 3GPP RANWG4, 3GPP TSG RAN Meeting #48, Seoul, Korea, Jun. 1-4, 2010, 2 pages.

3rd Generation Partnership Project (3GPP), TS 36.211 V10.0.0, "Technical Specification Group Radio Access Network, Evolved Universal Terrestrial Radio Access (E-UTRA), Physical Channels and Modulation", Dec. 2010, pp. 1-103.

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.211 V10.4.0, "Technical Specification Group Radio Access Network, Evolved Universal Terrestrial Radio Access (E-UTRA), Physical Channels and Modulation (Release 10)", Dec. 2011, pp. 1-101.

3rd Generation Partnership Project (3GPP), TS 36.211 V8.9.0, "Technical Specification Group Radio Access Network, Evolved Universal Terrestrial Radio Access (E-UTRA), Physical Channels and Modulation (Release 8)", Dec. 2009, pp. 1-83.

3rd Generation Partnership Project (3GPP), TS 36.211 V9.1.0, "Technical Specification Group Radio Access Network, Evolved Universal Terrestrial Radio Access (E-UTRA), Physical Channels and Modulation (Release 9)", Mar. 2010, pp. 1-85.

3rd Generation Partnership Project (3GPP), TS 36.212 V10.0.0, "Technical Specification Group Radio Access Network, Evolved Universal Terrestrial Radio Access (E-UTRA), Multiplexing and Channel Coding (Release 10)", Dec. 2010, pp. 1-72.

3rd Generation Partnership Project (3GPP), TS 36.212 V10.4.0, "Technical Specification Group Radio Access Network, Evolved Universal Terrestrial Radio Access (E-UTRA), Multiplexing and Channel Coding (Release 10)", Dec. 2011, pp. 1-79.

3rd Generation Partnership Project (3GPP), TS 36.212 V8.8.0, "Technical Specification Group Radio Access Network, Evolved Universal Terrestrial Radio Access (E-UTRA), Multiplexing and Channel Coding (Release 8)", Dec. 2009, pp. 1-60.

3rd Generation Partnership Project (3GPP), TS 36.212 V9.3.0, "Technical Specification Group Radio Access Network, Evolved Universal Terrestrial Radio Access (E-UTRA), Multiplexing and Channel Coding (Release 9)", Sep. 2010, pp. 1-61.

3rd Generation Partnership Project (3GPP), TS 36.212 V9.4.0, "Technical Specification Group Radio Access Network, Evolved Universal Terrestrial Radio Access (E-UTRA), Multiplexing and Channel Coding (Release 9)", Sep. 2011, pp. 1-61.

3rd Generation Partnership Project (3GPP), TS 36.213 V10.0.1, "Technical Specification Group Radio Access Network, Evolved Universal Terrestrial Radio Access (E-UTRA), Physical Layer Procedures (Release 10)", Dec. 2010, pp. 1-98.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.

3rd Generation Partnership Project (3GPP), TS 36.213 V10.4.0, "Technical Specification Group Radio Access Network, Evolved Universal Terrestrial Radio Access (E-UTRA), Physical Layer Procedures (Release 10)", Dec. 2011, pp. 1-125.

3rd Generation Partnership Project (3GPP), TS 36.213 V8.8.0, "Technical Specification Group Radio Access Network, Evolved

(56) References Cited

OTHER PUBLICATIONS

Universal Terrestrial Radio Access (E-UTRA), Physical Layer Procedures (Release 8)", Sep. 2009, pp. 1-77.
3rd Generation Partnership Project (3GPP), TS 36.213 V9.3.0, "Technical Specification Group Radio Access Network, Evolved Universal Terrestrial Radio Access (E-UTRA), Physical Layer Procedures (Release 9)", Sep. 2010, pp. 1-80.
3rd Generation Partnership Project (3GPP), TS 36.214 V10.0.0, "Technical Specification Group Radio Access Network, Evolved Universal Terrestrial Radio Access (E-UTRA), Physical Layer, Measurements (Release 10)", Dec. 2010, pp. 1-13.
3rd Generation Partnership Project (3GPP), TS 36.214 V10.1.0, "Technical Specification Group Radio Access Network, Evolved Universal Terrestrial Radio Access (E-UTRA), Physical layer, Measurements (Release 10)", Mar. 2011, pp. 1-13.
3rd Generation Partnership Project (3GPP), TS 36.214 V8.7.0, "Technical Specification Group Radio Access Network, Evolved Universal Terrestrial Radio Access (E-UTRA), Physical Layer-Measurements (Release 8)", Sep. 2009, pp. 1-12.
3rd Generation Partnership Project (3GPP), TS 36.214 V9.2.0, "Technical Specification Group Radio Access Network, Evolved Universal Terrestrial Radio Access (E-UTRA), Physical Layer, Measurements (Release 9)", Jun. 2010, pp. 1-14.
3rd Generation Partnership Project (3GPP), TS 36.321 V10.0.0, "Technical Specification Group Radio Access Network, Evolved Universal Terrestrial Radio Access (E-UTRA), Medium Access Control (MAC) Protocol Specification (Release 10)", Dec. 2010, pp. 1-53.
3rd Generation Partnership Project (3GPP), TS 36.321 V10.4.0, "Technical Specification Group Radio Access Network, Evolved Universal Terrestrial Radio Access (E-UTRA), Medium Access Control (MAC) Protocol Specification (Release 10)", Dec. 2011, pp. 1-54.
3rd Generation Partnership Project (3GPP), TS 36.321 V8.11.0, "Technical Specification Group Radio Access Network, Evolved Universal Terrestrial Radio Access (E-UTRA), Medium Access Control (MAC) Protocol Specification (Release 8)", Dec. 2011, pp. 1-47.
3rd Generation Partnership Project (3GPP), TS 36.321 V8.9.0, "Technical Specification Group Radio Access Network, Evolved Universal Terrestrial Radio Access (E-UTRA), Medium Access Control (MAC) Protocol Specification (Release 8)", Jun. 2010, pp. 1-47.
3rd Generation Partnership Project (3GPP), TS 36.321 V9.3.0, "Technical Specification Group Radio Access Network, Evolved Universal Terrestrial Radio Access (E-UTRA), Medium Access Control (MAC) Protocol Specification (Release 9)", Jun. 2010, pp. 1-48.
3rd Generation Partnership Project (3GPP), TS 36.321 V9.5.0, "Technical Specification Group Radio Access Network, Evolved Universal Terrestrial Radio Access (E-UTRA), Medium Access Control (MAC) Protocol Specification (Release 9)", Dec. 2011, pp. 1-48.
3rd Generation Partnership Project (3GPP), TS 36.331 V10.0.0, "Technical Specification Group Radio Access Network, Evolved Universal Terrestrial Radio Access (E-UTRA), Radio Resource Control (RRC), Protocol Specification (Release 10)", Dec. 2010, pp. 1-276.
3rd Generation Partnership Project (3GPP), TS 36.331 V10.4.0, "Technical Specification Group Radio Access Network, Evolved Universal Terrestrial Radio Access (E-UTRA), Radio Resource Control (RRC), Protocol Specification (Release 10)", Dec. 2011, pp. 1-296.
3rd Generation Partnership Project (3GPP), TS 36.331 V8.12.0, "Technical Specification Group Radio Access Network, Evolved Universal Terrestrial Radio Access (E-UTRA), Radio Resource Control (RRC), Protocol Specification (Release 8)", Dec. 2010, pp. 1-212.
3rd Generation Partnership Project (3GPP), TS 36.331 V9.5.0, "Technical Specification Group Radio Access Network, Evolved Universal Terrestrial Radio Access (E-UTRA), Radio Resource Control (RRC), Protocol Specification (Release 9)", Dec. 2010, pp. 1-252.
3rd Generation Partnership Project (3GPP), TS 36.331 V9.9.0, "Technical Specification Group Radio Access Network, Evolved Universal Terrestrial Radio Access (E-UTRA), Radio Resource Control (RRC), Protocol Specification (Release 9)", Dec. 2011, pp. 1-253.
Bernstein et al., "CPE WAN Management Protocol", DSL Forum, Technical Report, TR-069, May 2004, pp. 1-109.
Broadband Forum, "Femto Access Point Service Data Model", TR-196, Issue 1, Apr. 2009, pp. 1-131.
European Telecommunications Standards Institute (ETSI), TR 102 907 V1.1.1, "Reconfigurable Radio Systems (RRS), Use Cases for Operation in White Space Frequency Bands", Oct. 2011, pp. 1-62.
European Telecommunications Standards Institute (ETSI), TR 102 907 V0.0.9, "Reconfigurable Radio Systems (RRS), Use Cases for Operation in White Space Frequency Bands", Jan. 2011, pp. 1-54.
European Telecommunications Standards Institute (ETSI), TR 103 067 V0.0.4, "Reconfigurable Radio Systems (RRS), Feasibility Study on Radio Frequency (RF) Performances for Cognitive Radio Systems Operating in UHF TV Band White Spaces", Sep. 2011, pp. 1-44.
Federal Communications Commission, in the Matter of Unlicensed Operation in the TV Broadcast Bands, Additional Spectrum for Unlicensed Devices Below 900 MHz and in the 3 GHz Band, Second Memorandum Opinion and Order, FCC 10-174, Sep. 23, 2010, pp. 1-88.
Federal Communications Commission, in the Matter of Unlicensed Operation in the TV Broadcast Bands, Additional Spectrum for Unlicensed Devices Below 900 MHz and in the 3 GHz Band, Second Report and Order and Memorandum and Order, FCC 08-260, Nov. 14, 2008, pp. 1-130.
IEEE, "Standard for Information Technology—Telecommunicatoins and Information Exchange Between Systems—Local and Metropolitan Area Networks—Specific Requirements, Part 11: Wireless LAN Medium Access Control (MAC) and Physical Layer (PHY) Specifications", IEEE Std. 802. 11-2007, IEEE Computer Society, Jun. 12, 2007, pp. 1-1232.
Nakamura et al., "Site Specific Interference Estimation for Advanced Spectrum Management in Cognitive Radio Systems over White Space Spectrum", IEICE Technical Report, vol. 110, No. 252, the Institute of Electronics, Information and Communication Engineers, Japan, Oct. 27-29, 2010, pp. 177-184.

\* cited by examiner

| PROCEDURE | SOLUTION FOR SuppCC |
|---|---|
| DL LINK ADAPATATION | CELL MAY BROADCAST REFERENCE SYMBOLS USED BY THE UE TO CALCULATE CQI INFORMATION. THE UE MAY SEND THIS INFORMATION TO THE CELL ON THE PRIMARY CELL UPLINK COMPONENT CARRIER |
| | ALTERNATIVELY, THE CELL MAY RELY ON THE CQI INFORMATION FOR THE PRIMARY CELL AND USE A SCALING FACTOR TO DETERMINE THE CQI FOR THE SUPPLEMENTARY COMPONENT CARRIER |
| | ALTERNATIVELY, THE CELL MAY USE A FIXED CQI FOR THE SUPPLEMENTARY COMPONENT CARRIER, FOR EXAMPLE BASED ON THE MEASURED INTERFERENCE ON THE CHANNEL, OBSERVED HARQ RETRANSMISSION RATES, ETC. |
| DL HARQ | THE HARQ FEEDBACK FOR THE DL TRANSMISSIONS ON THE SuppCC MAY BE CARRIED IN THE PRIMARY DL COMPONENT CARRIER, FOLLOWING THE SAME "N+4" TIMING AS USED FOR PRIMARY DL COMPONENT CARRIER |
| | IF NECESSARY, HARQ RETRANSMISSION MAY BE CARRIED ON THE SAME CELL AS THE ORIGINAL TRANSMISSION |
| FRAME AND SUB-FRAME TIMING | THE UE MAY RELY ON THE PRIMARY CELL FOR THE TIMING INFORMATION |
| DOWNLINK CONTROL SIGNALING | THE SCHEDULING INFORMATION FOR THE DL CARRIERS MAY BE CARRIED ON THE PRIMARY CELL USING AN ENHANCED CROSS CARRIER SCHEDULING FUNCTIONALITY. THE PRIMARY CELL MAY SCHEDULE ALL DOWNLINK COMPONENT CARRIERS. |
| | ALTERNATIVELY, THE CONTROL INFORMATION MAY BE CARRIED ON THE SUPPLEMENTARY COMPONENT CARRIERS. |
| | LTE SYSTEM MAY DYNAMICALLY CHANGE FROM ONE METHOD TO ANOTHER; SAY DEPENDING ON THE QUALITY OF THE SUPPLEMENTARY CARRIER. |

FIG. 7

| PROCEDURE | SOLUTION FOR SuppCC |
|---|---|
| UL LINK ADAPTATION | THE UE MAY SEND SOUNDING REFERENCE SIGNALS TO THE CELL IN ORDER TO ALLOW SCHEDULING FOR UPLINK TRANSMISSIONS. |
| UL HARQ | THE HARQ FEEDBACK FOR THE UL TRANSMISSIONS ON THE SuppCC MAY BE CARRIED IN THE PRIMARY UL COMPONENT CARRIER, FOLLOWING THE SAME "N+4" TIMING AS USED FOR PRIMARY UL COMPONENT CARRIER<br><br>IF NECESSARY, HARQ RETRANSMISSIONS MAY BE CARRIED ON THE SAME CELL AS THE ORIGINAL TRANSMISSION |
| FRAME AND SUB-FRAME TIMING | THE UE MAY RELY ON THE PRIMARY CELL FOR THE TIMING INFORMATION – USING THE SAME TIMING ADVANCE AS USED FOR THE PRIMARY UPLINK COMPONENT CARRIER |
| DOWNLINK CONTROL SIGNALING | THE SCHEDULING INFORMATION FOR THE DL CARRIERS MAY BE CARRIED ON THE PRIMARY CELL USING AN ENHANCED CROSS CARRIER SCHEDULING FUNCTIONALITY. THE PRIMARY CELL MAY SCHEDULE ALL UPLINK COMPONENT CARRIERS. |

FIG. 8

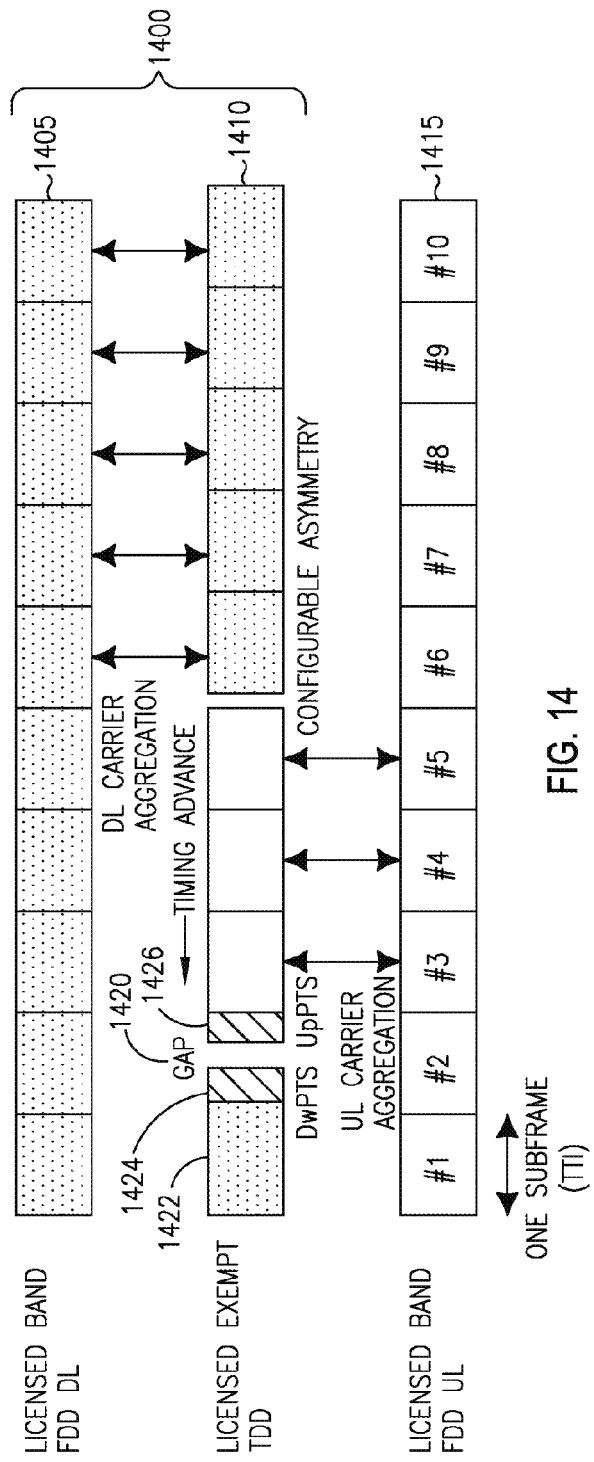

US 9,882,684 B2

METHOD AND APPARATUS FOR OPERATING SUPPLEMENTARY CELLS IN LICENSED EXEMPT SPECTRUM

CROSS REFERENCE TO RELATED APPLICATIONS

This application is a continuation of U.S. patent application Ser. No. 13/984,180, filed Jan. 16, 2014, which is the National Stage Entry under 35 U.S.C. §371 of Patent Cooperation Treaty Application No. PCT/US2012/024079, filed Feb. 7, 2012, which claims the benefit of U.S. provisional application No. 61/440,288, filed Feb. 7, 2011, U.S. provisional application No. 61/560,571, filed Nov. 16, 2011 the contents of which are hereby incorporated by reference herein.

FIELD OF INVENTION

This application is related to wireless communications.

BACKGROUND

As the number of mobile users continues to increase, additional licensed band spectrum is needed to support these mobile users. However, licensed band spectrum is not readily available and may be very expensive to acquire. Therefore, it is highly desirable to deploy cellular radio access technologies (RATs) such as, for example, long term evolution (LTE), in newly available spectrum such as television white space (TVWS) or unlicensed bands, which may be collectively referred to as licensed exempt (LE) spectrum.

Operation of the deployed RATs in LE spectrum may be modified to mitigate uncoordinated spectrum usage, as well as to support uplink (UL) and downlink (DL) operation without the need for fixed frequency duplex operation. For example, the spacing between available channels in TVWS may depend on the current location and use of the TVWS by primary users in the vicinity. Furthermore, some areas may only have one TVWS channel available, which may result in having to operate and provide both UL and DL resources on a single TVWS channel. In addition, operation over LE spectrum may be subject to the lower reliability of these channels, (as compared to operation over the licensed bands), and to frequently stop operation on a given channel due to high level interference, the arrival of a primary incumbent, coexistence database decisions, and the like.

Current carrier aggregation (CA) solutions may not be appropriate for these LE bands since the aggregated carriers may rely on the use of licensed secondary component carriers (SCCs), which are reliable and are used by operators with confidence. However, the aggregation scenarios they support may be rather restrictive, (for example, usually implementing DL scenarios where the number of DL SCCs may exceed the number of UL SCCs used in the aggregation).

SUMMARY

A method and apparatus for operating supplementary cells in licensed exempt (LE) spectrum. Supplementary cells may be deployed by a system to use LE bands, for example, opportunistic, sublicensed, television white space (TVWS), and industrial, scientific and medical (ISM) bands. The supplementary cells may be aggregated with an aggregating cell including, for example, primary cells and/or a secondary cells. In particular, the primary cell operating in a frequency division duplex (FDD) licensed spectrum may be aggregated with a LE supplementary cell operating in a time sharing mode for uplink (UL) and downlink (DL) operations. In one example, the LE supplementary cell may be an FDD supplementary cell dynamically configurable between an UL only mode, a DL only mode, and a shared mode, to match requested UL and DL traffic ratios. In another example, the LE supplementary cell may be a time division duplex (TDD) supplementary cell. The TDD supplementary cell may be dynamically configurable between multiple TDD configurations. In addition, a coexistence capability for coordinating operations between a LE supplementary cell with other systems operating in the same channel, possibly using another radio access technology (RAT) may be provided. Coexistence gaps may be provided to measure primary and secondary user usage and permit other systems operating in the same channel as the IE supplementary cell to access the channel.

BRIEF DESCRIPTION OF THE DRAWINGS

A more detailed understanding may be had from the following description, given by way of example in conjunction with the accompanying drawings wherein:

FIG. 7 shows example solutions for different procedures impacting supplementary component carriers (SuppCCs) in a downlink (DL)-only operating mode;

FIG. 8 shows example solutions for different procedures impacting SuppCCs in an uplink (UL)-only operating mode;

FIG. 14 shows an example of a licensed band frequency division duplex (FDD) primary cell containing both UL and DL component carriers (CCs) aggregated with a time division duplex (TDD) supplementary carrier; and FIG. 15 shows the physical channels that are supported on each carrier of a system supporting a licensed exempt operation.

DETAILED DESCRIPTION

Figure 1A:
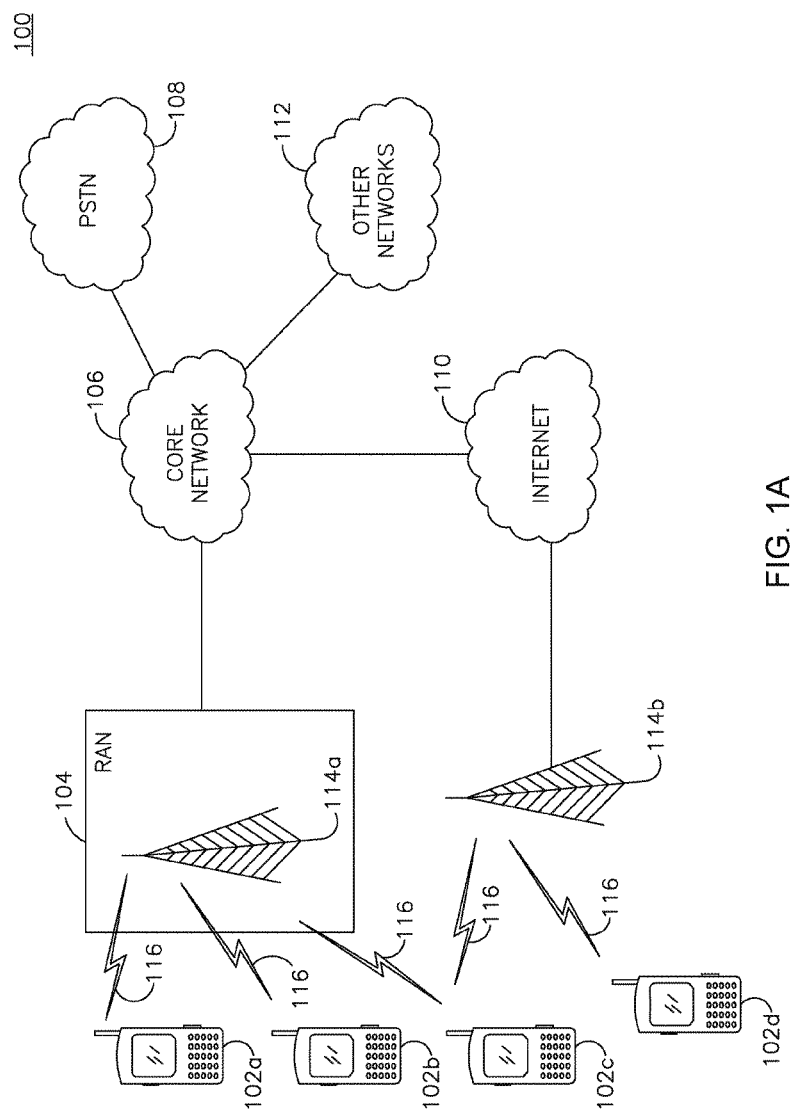
FIG. 1A shows an example communications system in which one or more described embodiments may be implemented.

FIG. 1A shows an example communications system 100 in which one or more described embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the described embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a notebook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed uplink (UL) packet access (HSUPA).

In another embodiment, the base station 114a and the WTRUs 102a, 102b. 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 IX, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE. LTE-A, and the like), to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over Internet protocol (VoIP) services to one or more of the WTRUs 102a, 102b, 102c, 102d. For example, the CN 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing an E-UTRA radio technology, the CN 106 may also be in communication with another RAN (not shown) employing a GSM radio technology.

The CN 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
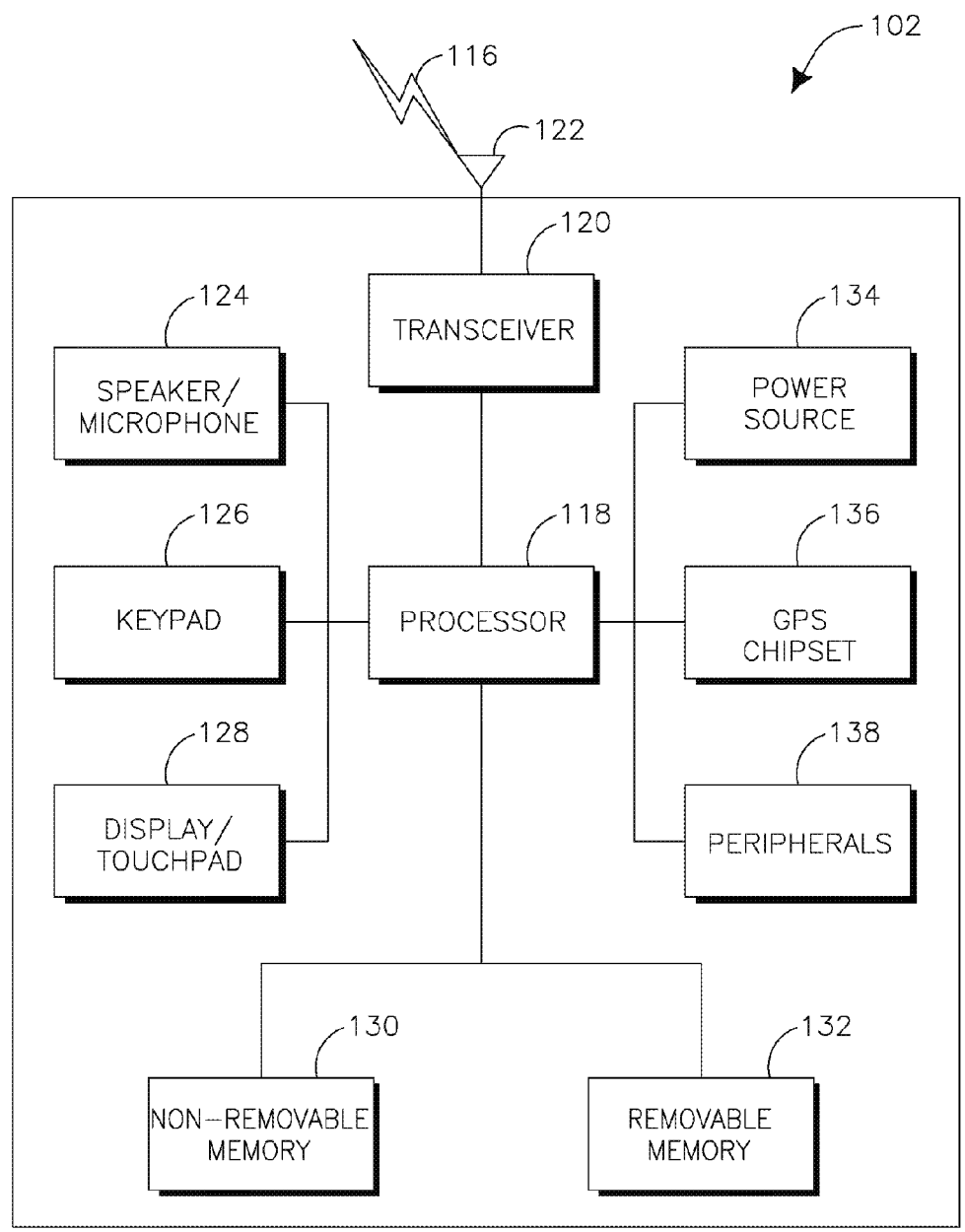
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 11B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple radio access technologies (RATs), such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114*a*, 114*b*), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
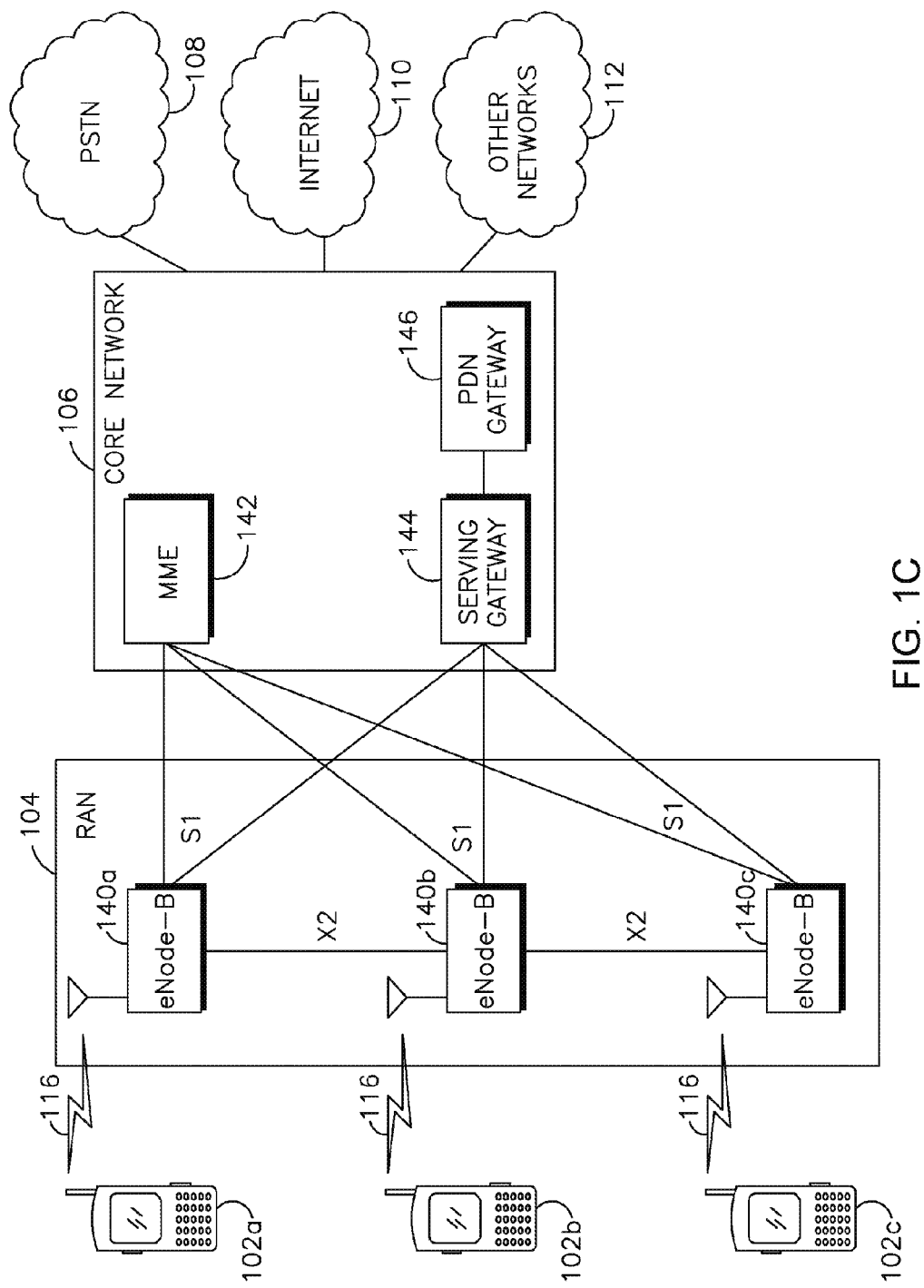
FIG. 1C shows an example radio access network and an example core network (CN) that may be used within the communications system shown in FIG. 1A.

FIG. 1C shows an example RAN 104 and an example CN 106 that, may be used within the communications system 100 shown in FIG. 1A. As noted above, the RAN 104 may employ an E-UTRA radio technology to communicate with the WTRUs 102a, 102b, 102c over the air interface 110. The RAN 104 may also be in communication with the CN 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the UL and/or DL, and the like. As shown in FIG. 1C, the eNBs 140a, 140b, 140c may communicate with one another over an X2 interface.

The CN 106 shown in FIG. 1C may include a mobility management entity (MME) 142, a serving gateway 144, and a packet data network (PDN) gateway (GW) 146. While each of the foregoing elements is depicted as part of the CN 106, it will be appreciated that any one of these elements may be owned and/or operated by an entity other than the CN operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when DL data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server), that serves as an interface between the CN 106 and the PSTN 108. In addition, the CN 106 may provide the WTRUs 102a, 102b, 102c with access to other networks 112, which may include other wired or wireless networks that are owned and/or operated by other service providers.

Figure 2:
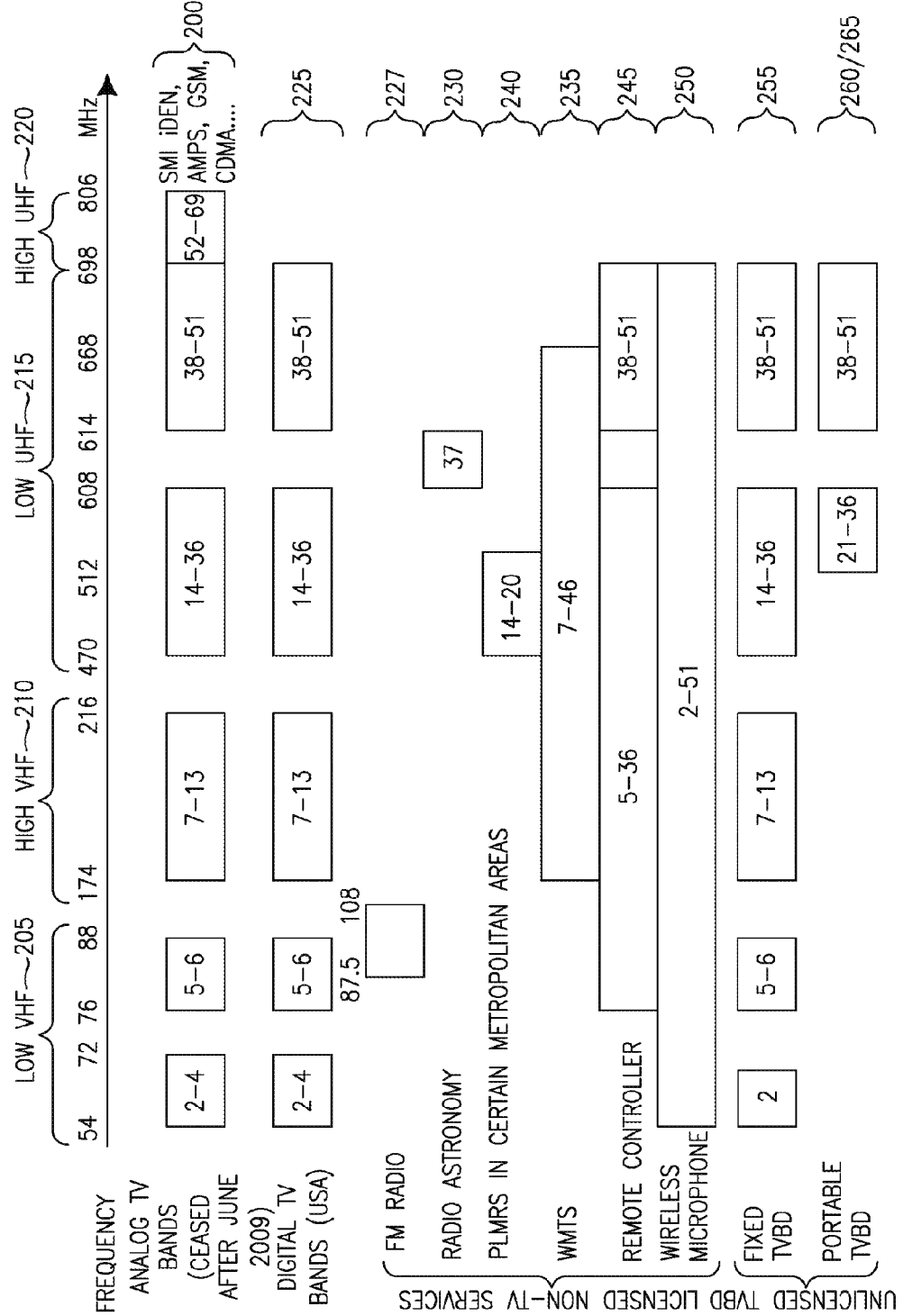
FIG. 2 shows an example of television (TV) band spectrum usage.

FIG. 2 shows the TV band spectrum usage. Analog TV bands 200 include the very high frequency (VHF) band and the ultra high frequency (UHF) band. The VHF band is composed of a low VHF band 205 operating from 54 MHz to 88 MHz, (excluding 72 MHz to 76 MHz), and a high VHF band 210 operating from 174 MHz to 216 MHz. The UHF band is composed of a low UHF band 215 operating from 470 MHz to 698 MHz, and a high UHF band 220 operating from 698 MHz to 806 MHz.

In the United States, the Federal Communications Commission (FCC) set Jun. 12, 2009 as the deadline for replacing analog TV broadcasting with digital TV broadcasting. The digital TV channel definitions are the same as the analog TV channel. The digital TV bands 225 may use analog TV channels 2 to 51 (except 37), while the analog TV channels 52 to 69 may be used for new non-broadcast users.

The frequency allocated to a broadcasting service, but not used locally, is called white space (WS). Television WS (TVWS) refers to TV channels 2 to 51, (except 37).

Besides TV signals, there are other licensed signals transmitted on the TV bands. The starting frequency of frequency modulation (FM) channel 227 is 87.9 MHz, which partial overlaps TV channel 6. Channel 37 is reserved for radio astronomy 230 and wireless medical telemetry service (WMTS) 235, where the latter may operate on any vacant TV channels 7 to 46. The private land mobile radio system (PLMRS) 240 uses channels 14 to 20 in certain metropolitan areas. Remote control devices 245 may use any channels above channel 4, except channel 37. The wireless microphone 250 uses channels 2 to 51 with a bandwidth of 200 kHz.

Furthermore, the FCC allows unlicensed radio transmitters to operate on the TVWS except channels 3, 4 and 37, as long as minimum interference is caused to the licensed radio transmissions. Hence, the operation of unlicensed radio transmitters may have to satisfy several restrictions. There are three kinds of unlicensed TV band devices (TVBDs): a fixed TVBD 255, a mode I portable (or personal) TVBD 260, and a mode II portable (or personal) TVBD 265. Both fixed TVBDs 255 and mode II portable TVBDs 205 may have a geo-location/database access capability and register to a TV band database. Access to the TV band database is used to query the allowed TV channels, so as to avoid the interference with digital TV signals and licensed signals transmitted on the TV bands. Spectrum sensing is considered as an add-on feature for TVBDs to minimize interference caused to digital TV signals and licensed signals. Furthermore, a sensing-only TVBD may be allowed to operate on TVWS if its access to a TV band database is limited.

Fixed TVBD 255 may operate on channels 2 to 51, except channels 3, 4, 37, but it cannot operate on the same or the first adjacent channel to a channel used by TV services. The maximum transmission power of fixed TVBD 255 is 1 W, with at most 6 dBi antenna gain. Hence, the maximum effective isotropic radiated power (EIRP) is limited to 4 W. Portable TVBDs 260 and 265 can operate on channels 21 to 51, except channel 37, but it cannot operate on the same channel used by TV services. The maximum transmission power of portable TVBDs 260 and 265 are 100 mW or 40 mW, if it is on the first adjacent channel to a channel used by TV services. Furthermore, if a TVBD device is a sensing-only device, then its transmission power cannot exceed 50 mW. All the TVBDs have strict out-of-band emissions. The antenna (outdoor) height of fixed TVBD must be less than 30 meters, while there is no limitation on the antenna height for portable TVBD.

A cell is typically controlled by a single base station. In LTE, a primary cell may refer to the cell which a given WTRU camps and uses for most of its mobility related procedures. The primary cell may include, but is not limited to, an uplink component carrier (UL CC) and a downlink component carrier (DL CC) or solely to a DL CC. When a cell is aggregated with a primary cell, the aggregated cell may be referred to as a secondary cell. Although the description herein below is in terms of the primary cell, a secondary cell may also used in place of the primary cell.

As described herein, the term supplementary cell may refer to enhanced operations in an LE spectrum. The supplementary cell may refer to a cell operating in LE spectrum or bands in conjunction with primary and secondary cells, (where the term aggregating cell may refer to a primary cell, a secondary cell or both). The supplementary cell may be DL only, UL only or time division duplex (TDD) UL/DL. The supplementary cell may include a DL supplementary CC (DL SuppCC), an UL SuppCC or both. Although the description herein may refer to SuppCCs, it is also applicable to supplementary cells.

SuppCCs may be deployed in an opportunistic fashion to make use of LE spectrum including but not limited to TVWS, industrial, scientific and medical (ISM), sublicensed, or opportunistic bands or spectrum. In an embodiment, heterogeneous network deployments make use of advanced LE carrier aggregation (CA) methods, systems and devices to provide hot-spot overage.

Figure 3:
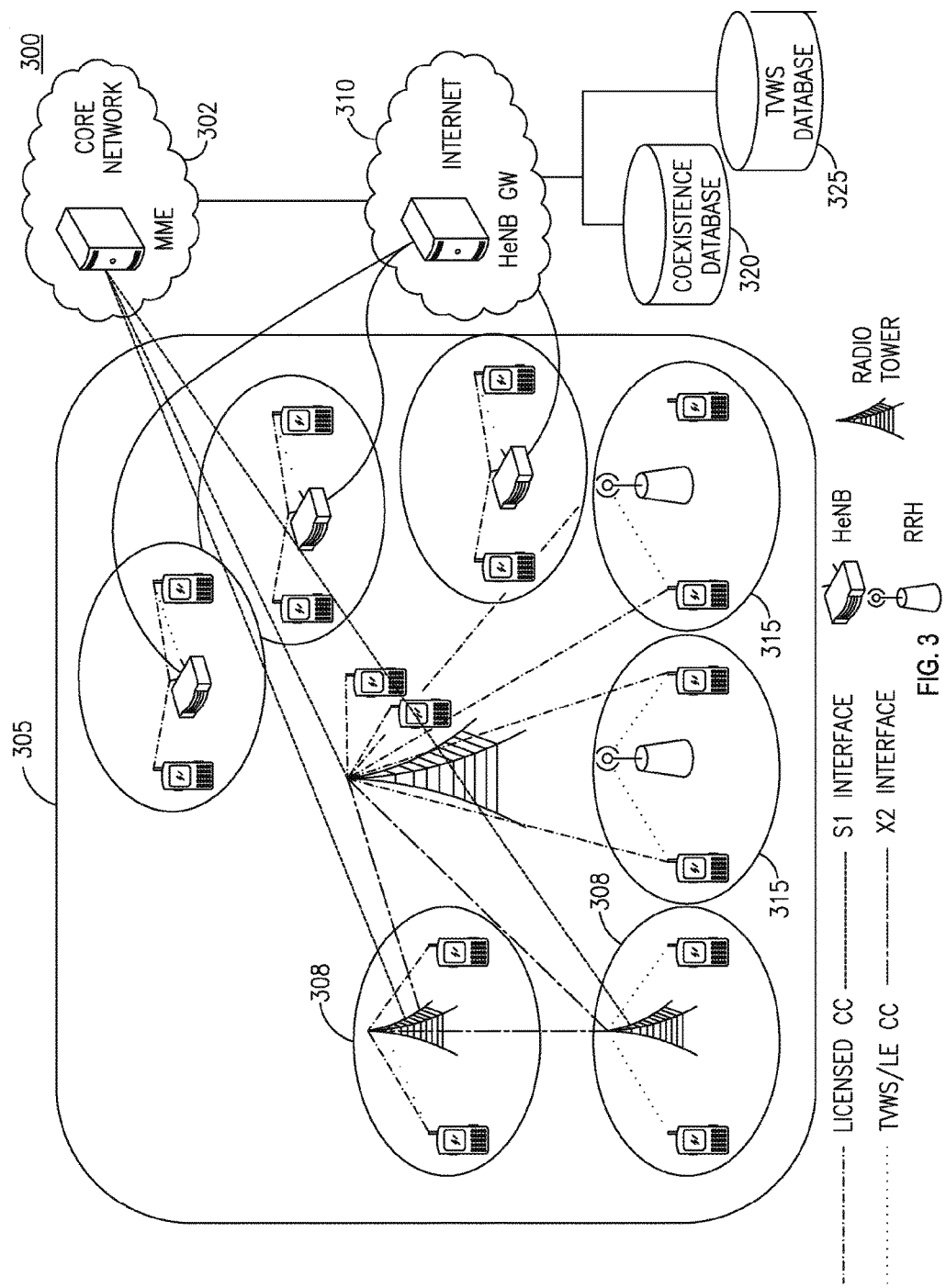
FIG. 3 shows an example of licensed exempt carrier aggregation deployment.

FIG. 3 shows an example of LE CA deployment. A heterogeneous network architecture 300 may include a core network 302, an LTE macro cell 305 and an underlay of pico cells 308, femto cells 310 and remote radio head (RRH) cells 315 that may aggregate licensed and LE bands. Macro cells 305 may provide service continuity, and pico cells 308 and femto cells 310 may provide hot-spot coverage. A coexistence database 320 along with new mechanisms such as coexistence gaps may be implemented to coordinate operation with other secondary networks and users operating in LE bands. A TVWS database 325 may be used to protect incumbent users operating in the TVWS band. Infrastructure to support dynamic spectrum trading may be implemented across both licensed and LE bands. LE bands may be used by both HeNB deployments or RRH/pico cell campus type deployments.

Described herein below are embodiments and examples of systems and methods for aggregation over LE bands. In an embodiment, aggregation over LE bands may be performed by implementing a system which aggregates licensed carriers/cells (using LTE frequency division duplex (FDD)) with one or more SuppCCs), using a time division duplex (TDD) configuration that may be dynamically changed by the pico/femto cell, (which may be referred to herein as enhanced TDD). In another embodiment, a dynamically changed enhanced TDD configuration may be implemented to alter the duration of a guard period between uplink (UL)/downlink (DL) transitions based on the frequency of operation of a SuppCC.

An enhanced TDD operation may be implemented in another embodiment where hybrid automatic repeat request (HARQ) feedback timing for the SuppCC may be based on the "n+4" timing used for the primary cell. The primary cell may be used to carry HARQ feedback for the DL, and UL transmissions on the SuppCC, as well as the channel state information (CSI) for the SuppCCs. An enhanced TDD operation may be implemented in another embodiment where timing for UL grants for the SuppCC is based on "n+4" timing. That is, current sub-frame "n" carries UL scheduling/grant for sub-frame "n+4". The grant information may be carried on the SuppCC or it may be carried on the primary CC (PCC), (e.g., relying on cross-carrier scheduling).

Another system embodiment may be implemented which aggregates licensed carriers, (using LTE FDD), with one or more SuppCCs, and where these SuppCCs may dynamically change from being configured as UL only, DL only, or shared, (quick toggling of sub-frames from UL to DL and vice versa). A shared mode aggregation embodiment may be implemented where the SuppCC may rely on the primary cell CCs for sub-frame timing.

Another shared mode aggregation embodiment may be implemented which provides for flexible UL/DL ratios resulting in optimum DL:UL sub-frame patterns. The pattern may be based on a repeat-K structure, with N DL sub-frames followed by M UL sub-frames N+M=K. HARQ feedback may be bundled to compensate for UL/DL asymmetry. Downlink control information (DCI) may carry an indication as to the sub-frame where the information is applicable. HARQ round-trip-time (RTT) may be variable and depend on the sub-frame used for the prior transmission. The HARQ feedback may be sent on the primary cell CC or the SuppCC based on the sub-frame used for the prior transmissions.

Based on the need to operate both UL and DL resources in the same LE channel, the general approach for the embodiments described herein is to use an FDD licensed spectrum as a primary cell which provides both UL and DL primary component carriers (PCCs), and to dynamically aggregate a supplementary LE carrier in either the UL or DL for a given time interval. This ensures that the radio operating in the LE spectrum does not need to transmit or receive in the LE band simultaneously.

Figure 4:
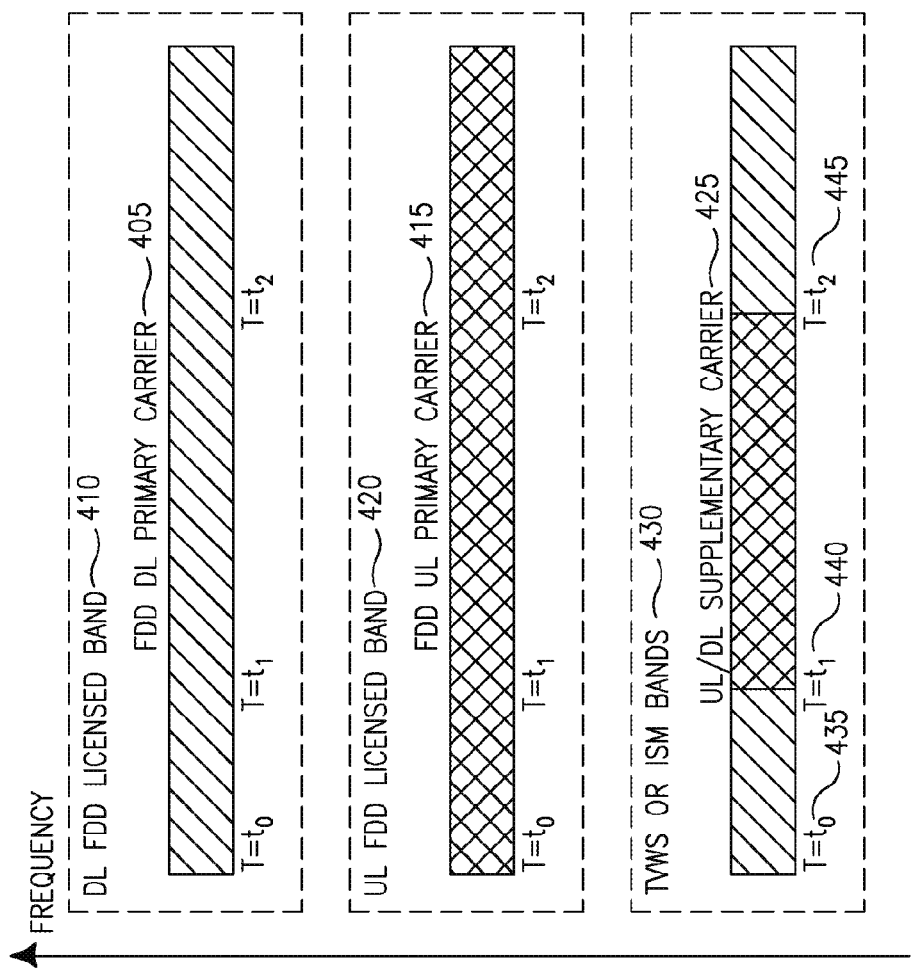
FIG. 4 shows an example of licensed exempt carrier aggregated with a long term evolution (LTE) primary cell.

FIG. 4 shows an example of a supplementary LE carrier aggregated with an LTE primary cell. The LTE primary cell may include an UL CC and a DL CC, or a DL CC only. In particular, the LTE primary cell may include an FDD DL primary carrier 405 operating on a DL FDD licensed band 410 and an FDD UL primary carrier 415 operating on, an UL FDD licensed band 420, which are carrier aggregated with an UL/DL SuppCC 425 operating in a LE band 430, for example, TVWS or ISM bands. The UL/DL SuppCC may alternate between DL operation in one time interval 435, UL operation in another time interval 440. DL operation in another time interval 445 and so on.

Although the embodiments show a single SuppCC, it should be understood that the embodiments presented can be extended to cases with multiple SuppCCs. In all cases, the SuppCCs may be treated as additional bandwidth to be used for communication to/from LE-capable WTRUs. All decisions regarding the activation, deactivation, and (re)configuration of SuppCCs may be driven by algorithms, processes and methods running in a radio resource management (RRM) functionality.

The RRM may provide an indication of the ratio of UL and DL resources required for the SuppCC(s), depending on observed system conditions. The RRM may attempt to resolve UL congestion if this ratio is skewed to the UL side, DL congestion if this ratio is skewed to the DL side, or system-wide congestion, (increasing the capacity available on both the UL and DL), if the ratio is almost symmetric.

The RRM may provide some indication as to how long the supplementary cell may be used with this ratio, or additional information, (potentially providing constraints), on use of the supplementary cell.

Described herein are two embodiments that illustrate SuppCC realizations. In the first embodiment, the FDD primary cell is aggregated with a dynamic FDD SuppCC and in the second embodiment, the FDD primary cell is aggregated with an TDD SuppCC.

Described initially are system considerations applicable to both embodiments. A system embodiment may require a coexistence capability so that the LTE system may coexist with other systems operating in an LE spectrum. Such coexistence may be coordinated, (via direct and/or indirect communication), or non-coordinated between the different systems, (the term coexistence does not presume fair usage of the spectrum). The LTE system may be able to operate even in the presence of other systems operating in LE spectrum. The LTE system may coexist with systems using LTE as well as other RATs. In addition, heterogeneous coexistence with a WiFi system may be supported. In a coordinated single RAT scenario, coexistence may allow for co-channel sharing. In non-coordinated scenarios, coexistence may rely on lower layer mechanisms, such as coexistence gaps or other interference mitigation algorithms.

Supplementary cell operation may adapt to different types of TVWS channels and other LE bands. For example, one type may be sublicensed channels. A sublicensed channel may be a TVWS channel that is sublicensed to an operator or user for a specific geographical area and for a specific time which is not used by any primary user and other secondary users, (i.e., typically a channel originally owned by a digital television (DTV) broadcast station but was made available through an agreement and/or brokerage). Another example may be an available channel type. This type may include an available TVWS channel that is not occupied by a primary user (PU) but may be used by any secondary users (SU). Another example may be a PU assigned channel type. This type may be an assigned TVWS channel that is used by a PU which may require SUs to leave the channel if a PU is detected.

Figure 5:
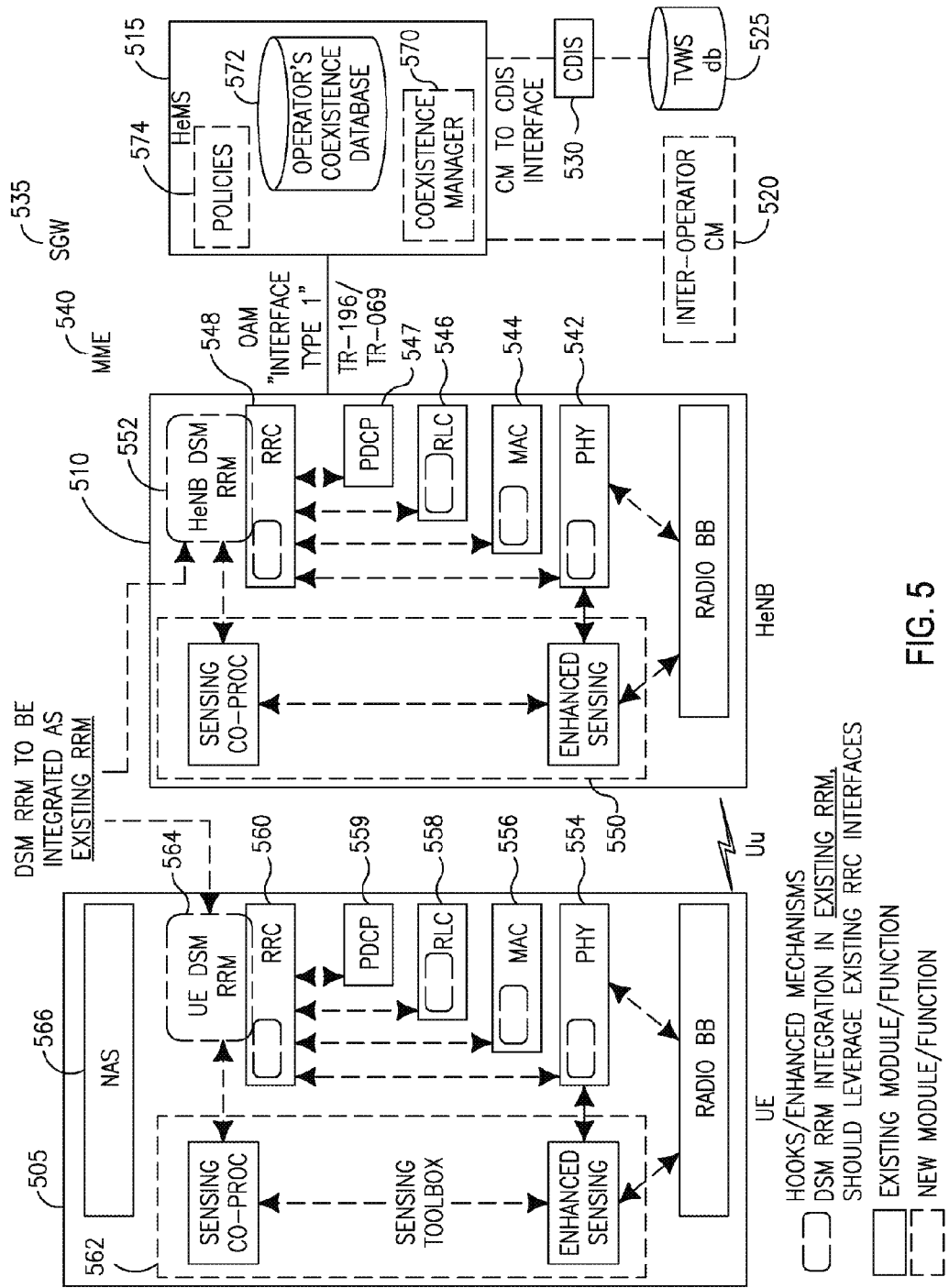
FIG. 5 shows an example of a high level advanced LTE spectrum solution (ALTESS) operation.

FIG. 5 shows an example of a high level advanced LTE spectrum solution (ALTESS) in a system 500 including a WTRU 505, an HeNB 610, an HeNB management system (HeMS) 515, an inter-operator coexistence manager (CM) function 520, a TVWS database 525, a coexistence discovery and information server (CDIS) 530, a serving gateway (SGW) 535 and a mobility management entity (MME) 540.

The HeNB 510 may include a physical (PHY) layer 542, a medium access control (MAC) layer 544, a radio link control (RLC) layer 546, a packet data convergence protocol (PDCP) layer 547, a radio resource control (RRC) layer 648, a sensing toolbox 550 and an HeNB dynamic spectrum management (DSM) radio resource management (RRM) entity 552. The HeNB 510 may be enhanced to support operation in TVWS and other LE bands. Functions in the different LTE layers of the HeNB 510, (a PHY layer 542, a MAC layer 544, an RLC layer 546 and an RRC layer 548), may be enhanced to support the operation in the TVWS and other LE spectrum by new mechanisms and/or hooks. For example, the PHY layer 542 may be modified to support operation of the aggregated CCs in an LE band with no fixed frequency duplex separation, and enhance feedback channels in LTE to support UL or DL only CCs, or other enhancements to support UL "heavy" configurations or optimize HARQ performance. The PHY layer 542 and the RRC layer 548 may be modified to reduce the overhead associated with carrying unnecessary control channel information. The MAC layer 544 and the PHY layer 542 may be modified to introduce a coexistence gap in LTE transmissions to allow access to other secondary users. The RRC layer 548 may be modified to support enhancement for measurements and to detect primary users. The RRC layer 648 may be modified to support new triggering mechanisms to transition into the different new modes of operation in FDD frame structure solutions. The MAC layer 544 and the RLC layer 646 may be modified to handle DL/UL transition, especially for HARQ buffers.

A sensing toolbox 550 may be integrated in the HeNB 510 for performing and processing cognitive sensing on the LE spectrum and reporting the results to the HeNB DSM RRM entity 552. The HeNB DSM RRM entity 652 may be an enhancement of an existing HeNB RRM by ALTESS features related to the TVWS spectrum management and operation. Also it may control/configure the sensing toolbox operation. As described herein below, RRM functions may be required to support channel allocation algorithms that may quickly adapt to temporal variations in channel availability and quality. The HeNB 510 may also include a coexistence enabler function which acts as an interface between the CM 520 and the cognitive networks, for example white space radio systems or TVBD networks. Its functional roles are translating reconfiguration commands received from the CM 520 into network-specific reconfiguration commands and sending them to the cognitive network, so that the later can reconfigure itself.

The WTRU 505 may include a PHY layer 554, a MAC layer 556, an RLC layer 558, a packet data convergence protocol (PDCP) layer 559, an RRC layer 560, a sensing toolbox 562, a WTRU DSM RRM entity 564 and a non-access stratum (NAS) layer 566. The WTRU 505 may be enhanced to support TVWS and LE operation.

Functions in the different LTE layers of the WTRU 505, (PHY layer 564, MAC layer 556, RLC layer 558 and RRC layer 560), may be enhanced to support the operation in the TVWS and other LE spectrum by new mechanisms and/or hooks. These may be the client side of the enhancements required as previously described for the HeNB 510.

A sensing toolbox 562 may be integrated in the WTRU 505. It is responsible for performing and processing cognitive sensing on the TVWS and other LE spectrum and report the results to the WTRU DSM RRM entity 564 and supporting measurement gaps for primary/secondary user detection. WTRUs supporting this capability may benefit from having access to a broader set of TVWS CCs. The WTRU DSM RRM entity 564 may be an enhancement of the existing WTRU RRM to support the HeNB DSM RRM entity 552 operation as well as to control and configure the operation of the sensing toolbox 562 operation.

The HeMS 515 is a third generation partnership project (3GPP) LTE operations, administration and maintenance (OAM) entity that may configure multiple HeNBs. The HeMS 515 may be able to reboot the HeNB 510, setup the operating frequencies in the licensed bands, as well as PHY/MAC parameters, command the start/stop transmissions on certain frequencies and download software to the HeNB 510.

The HeMS 515 may include a coexistence manager (CM) entity 570, an operator's coexistence database 572 and policies 574. The CM entity 570 may be responsible for managing inter-HeNBs as well as an inter-operator coexistence operation. For example, the CM entity 570, based on information received from the TVWS database 525, the CDIS 530 and sensing and usage data may process the initial list of available channels from the TVWS database 525 and provide channel usage information to the inquiring HeNB, which may include a processed list of candidate channels and additional information from which the HeNB may select the channel(s). The sensing and usage data may originate from the HeNBs under its supervision, as well as information from neighbor networks (inter-operator), and may be stored in the operator's coexistence database 572. The CM entity 570 may be connected to a third party that provides a TVWS channel brokerage service.

The CM entity 570 may maintain the operator coexistence database 572, update the CDIS 530 and the TVWS database 525 about the networks within the operator's control, acquire sensing and usage data including information from neighboring CM functions, and construct and maintain an interdependency mapping for each HeNB under its supervision to identify HeNBs and access points (APs) of the operator's network as well as other networks registered in the CDIS potentially interfering or impacted by the given HeNB.

The CM entity 570 may process and forward the TVWS channel usage information to requesting HeNBs which may include some initial ranking of the available channels as well as proposing non-conflicting physical cell identifiers (IDs) for each channel frequency.

The operator's coexistence database 572 may contain the TVWS usage information (i.e., sensing and usage data) of all networks operating in that band which may impact the operator's own network. The operator's coexistence database 672 may reside in the HeMS 615 next to the CM entity 570 and may contain a number of entries, each one corresponding to one HeNB entity or AP operating on TVWS bands.

An interface 576, (i.e., OAM "interface type 1"), may be used to exchange coexistence information between the HeNB 510 and the HeMS 515, as well as perform existing management functions as described below. It may also be used to transfer policies 574 between the HeMS 615 and the HeNB 510. The interface 576 may instruct use of a management protocol, for example a TR-069 management protocol, which supports a variety of functionalities allowing the HeMS 515 to manage multiple HeNBs including the following primary capabilities: auto-configuration and dynamic service provisioning, software/firmware image download and management, status and performance monitoring, and diagnostic. A data model for a femto cell for remote management may use the TR-069 management protocol.

The TVWS database 525 may be a geo-location database map of reserved TVWS channels for microphone and DTV signals complying to FCC regulations. Mode II or fixed TVWS devices may query directly or indirectly the TVWS database 525 by indicating their geo-location to obtain access to an available channel. In this architecture, the CM entity 570 may query the TVWS database 525 on behalf of the HeNB 510 to obtain a list of available channels.

The CDIS 530 may provide neighbor discovery service to CM entities. Based on the location provided, the CDIS 530 may respond with a list of CMs under which networks are operating at that specific location, as well as the contact information of those networks. TVWS usage information of secondary networks may be stored in the CDIS 630. However, this information may be distributed in the operator's coexistence database 572.

The SGW 535 may be configured to perform packet routing and forwarding, lawful interception, transport level packet marking in the UL and DL, charging per WTRU, packet data network (PDN) and quality of service (QoS) class identifier (QCI), and mobility anchoring.

The MME 540 may be configured to perform NAS signaling, NAS signaling security, access stratum (AS) security control, idle mode WTRU reachability, tracking area list management, PDN and SGW selection, authentication, roaming and bearer management functions.

Described herein is supplementary or supplemental cell operation. As described herein above, the supplementary cell is a cell operating in LE spectrum or bands, for example TVWS and/or ISM bands, in conjunction with primary and secondary cells. The supplementary cell may not operate as a standalone cell. WTRUs may not select supplementary cells in idle mode. Supplementary cells may be used to aggregate additional CCs to a primary cell. System information block (SIB) information associated with the supplementary cell may not be broadcast, and WTRUs operating under this supplementary cell may be signaled associated SIB information through dedicated signaling.

LE bands, such as the TVWS band, may not have a predetermined fixed frequency duplex separation which may make it difficult to arbitrarily define a fixed frequency duplex separation between DL and UL transmission. Furthermore, it may be possible that only one supplementary CC may be available at a given time. Therefore, the supplementary cells active in a given band may operate in TDD fashion. In one embodiment, supplementary cell aggregation using CCs may be based on an existing TDD frame structure. In another embodiment, supplementary cell aggregation using CCs may be based on the existing FDD frame structure. In the latter case, the HeNB may dynamically change the supplementary CCs to operate in the DL or the UL. In the case of heavy UL traffic demand, the supplementary cell will operate in UL only for a long period of time until UL congestion is mitigated. For example, if UL traffic congestion is detected, the supplementary cell currently operating in DL may switch to operate in UL only operation until UL congestion is mitigated. Furthermore, both embodiments may be simplified or enhanced, as supplementary cells may rely on the capability of the primary cell to carry control and feedback information.

The supplementary cell may require the introduction of coexistence gaps to free up the medium and thus enable other wireless networks to gain access to the medium. During these gaps, new measurements may be taken to assess usage of both primary and secondary users. A listen-before-talk mechanism may be introduced at the end of the coexistence gaps.

Supplementary cells may be non-Release 8 (R8) backward compatible, which may allow certain information overhead to be removed. Likely resources that may be released are the master information block (MIB), SIB and a portion of the physical DL control channel (PDCCH) in the DL. In the UL, resources associated with the random access channel (RACH) and the physical UL control channel (PUCCH) may also be released. A primary shared channel (SCH) and a secondary SCH may remain for frequency synchronization and cell search purposes.

The supplementary cells may not be as static as secondary cells as the HeNB may have to frequently stop operation on a given supplementary cell due to high level interference, the arrival of primary users or coexistence database decisions, and the like. Active supplementary cells may have to operate in the presence of a higher level of interference than what is typically present in the licensed spectrum, and may include new types of interferers, such as WiFi, Bluetooth® and even non-communication interferers such as microwave ovens.

Therefore, critical control information such as the PDCCH, reference symbols, and the like, may be required to be sent in a more robust way.

Described herein is an FDD primary cell aggregating a dynamic FDD SuppCC. In particular, an FDD carrier, (operating in a licensed spectrum), aggregates a dynamic FDD supplementary carrier, (operating in a LE spectrum), using the existing FDD frame structure and which may dynamically change the SuppCC to aggregate in the DL or the UL. The CCs may be configured to address the required ratio of UL and DL resources or traffic, and can be in one of three operating modes. DL only, UL only, and shared.

Figure 6:
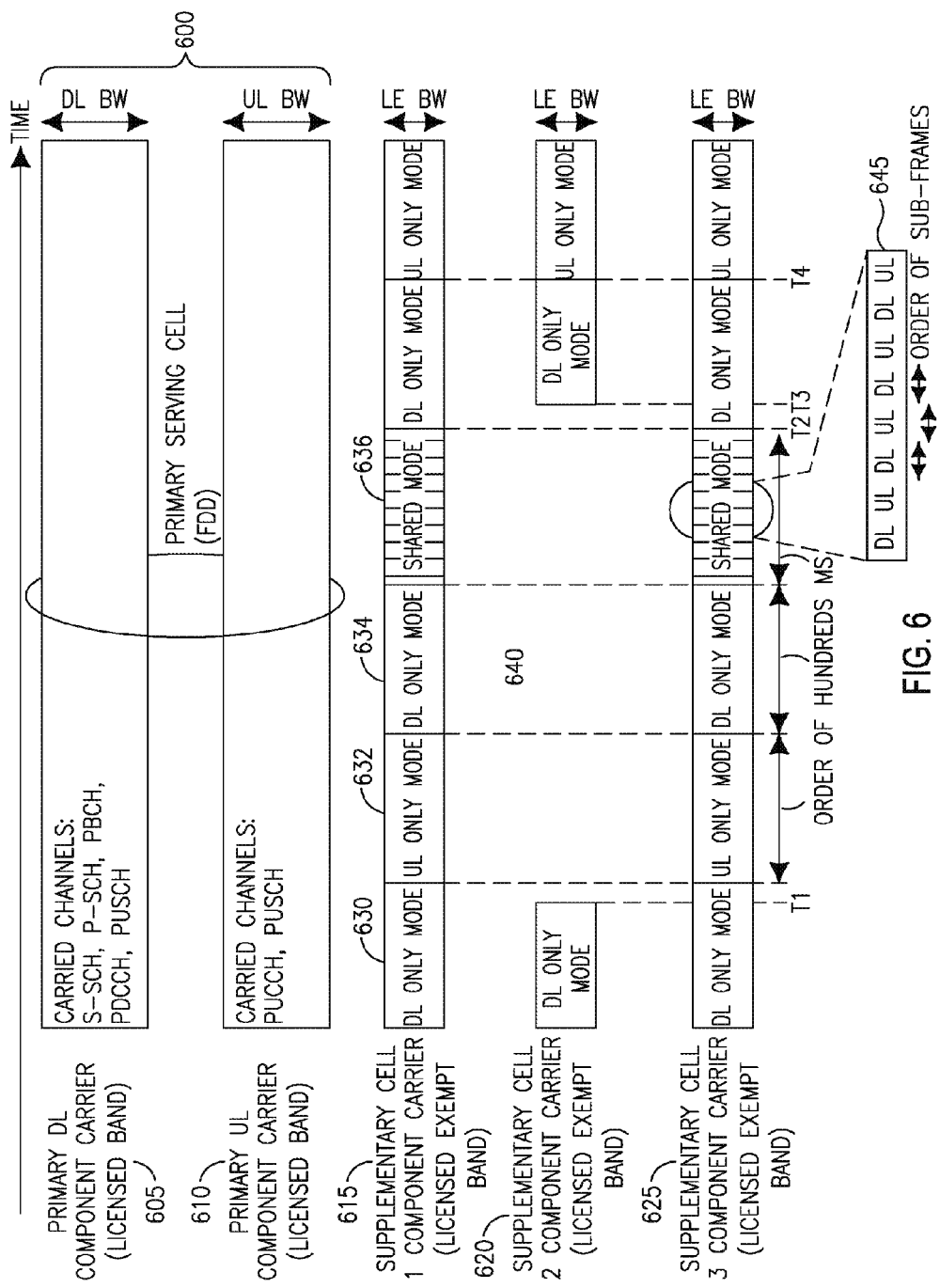
FIG. 6 shows an example of dynamic frequency division duplex (FDD) operating modes.

FIG. 6 shows an example of dynamic FDD operating modes. A cell 600 may include a primary DL CC 605 operating in a licensed hand and a primary UL CC 610 operating in a licensed band. Also shown are three supplementary cell CCs 615, 620 and 626 using dynamic FDD. Each of the supplementary cells may transition between the three operating modes. In one example, the supplementary cells may transition independently from each other. For example, supplementary cell1 615 may transition from a DL only mode 630, to an UL only mode 632, back to another DL only mode 634 and then to a shared mode 636. In this embodiment, supplementary cell may be activated and deactivated as needed. For example, supplementary cell2 620 is deactivated between times T1 and T3 640.

The SuppCCs may not necessarily be the same size as the licensed band carriers. For example, the three SuppCCs 615, 620 and 625 may be 5 MHz SuppCCs in aggregation with a 10 MHz primary FDD cell, (which may include both an UL and DL CC). If more than one SuppCC is configured, the operating mode may be the same across all activated SuppCCs. This may be performed to reduce the implementation complexity at the WTRUs. In the embodiment shown, all SuppCCs are operating in DL only mode between times T3 and T4.

In one example, the SuppCCs may be in a DL-only mode, characterized by a desired DL:UL ratio heavily skewed on the DL. This mode may be used to relieve DL congestion. The cell may schedule DL transmissions on these DL SuppCCs to all capable WTRUs.

In another example, the SuppCCs may be in an UL-only mode, characterized by a desired DL:UL ratio heavily skewed on the UL. This mode may be used to relieve UL congestion. The cell may schedule UL transmissions on these UL SuppCCs to all capable WTRUs.

In another example, the SuppCCs may be in a shared mode, characterized by carriers which may quickly toggle between the UL and the DL. For example, the toggling interval may be of an order of several sub-frames. In particular, over a period K+L sub-frames, the SuppCCs may be used for DL transmissions in K sub-frames and for UL transmissions in L sub-frames. K and L, are chosen to match the requested DL:UL ratio (DL:UL~K/(K+L):L(K+L)). For example, supplementary cell3 625 shows a 50%:50% DL/UL ratio, with the supplementary cell CC toggling every several sub-frames 645.

In addition, although FIG. 6 shows only a primary serving cell and a number of supplementary cells, it should be understood that the aggregation may extend over a number of secondary serving cells.

If required, an LTE system may operate a SuppCC on a single operating mode, (deactivating the SuppCC when no longer needed). Alternatively, the LTE system may dynamically change from one operating mode to another.

The DL-only operating mode may be characterized by the primary CCs (UL and DL) aggregated with one or more DL SuppCCs. The cell may uses the SuppCCs as additional bandwidth on which it may schedule DL transmissions. FIG. 7 shows example solutions for different procedures impacting SuppCCs in a DL-only operating mode.

The UL-only operating mode may be characterized by the primary CCs (UL and DL) aggregated with one or more UL SuppCCs. The cell uses the SuppCCs as additional bandwidth on which it may grant UL capacity to a WTRU. FIG. 8 shows example solutions for different procedures impacting SuppCCs in an UL-only operating mode.

In a shared operating mode, the pico/femto cell may determine the best pattern to match the requested DL:UL ratio requested from the RRM functionality. The pico/femto cell may determine this dynamically, (e.g., based on some formulas, or it may have a preconfigured set). When determining the optimum pattern, the pico/femto cell may rely on a number of guiding principles including, for example, minimizing the number of UL to DL transitions and DL to UL transitions, or minimizing the effect on hybrid automatic repeat request (HARQ) procedures that deal with positive acknowledgement (ACK)/negative acknowledgement (NACK) transmission and HARQ retransmissions.

The SuppCC using a shared operating mode may rely only on sub-frame timing, which may be derived from the PCC. The DL sub-frames may be time aligned with the DL sub frames on the DL PCC.

Figure 9:
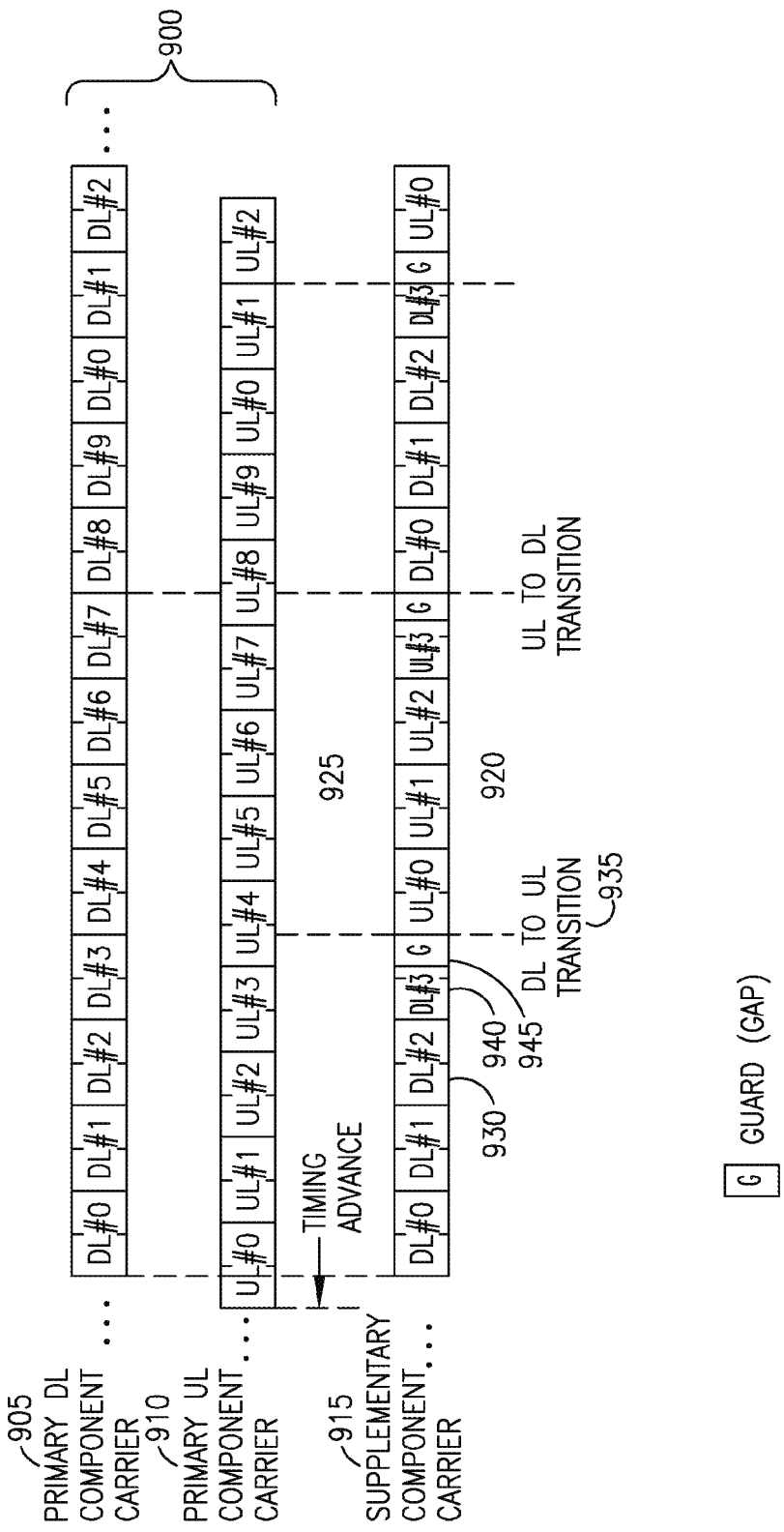
FIG. 9 shows an example of timing alignment for a 4DL:4UL related pattern.

FIG. 9 shows an example of timing alignment for a 4DL:4UL related pattern. A cell 900 may include a DL PCC 906 and an UL PCC 910. The cell 900 may be aggregated with a SuppCC 915. In this embodiment, while the UL sub-frames 920 are time aligned with the UL PCC sub-frames 925, the UL sub-frames 920 may be time-advanced to reduce the potential interference with the DL sub-frame transmissions 930. This timing advancement may be tied to that of the PCC.

At the DL-UL transition 935, the DL sub-frame 940 may be a special sub-frame that is only partially used for data transmission. The rest of the sub-frame 940 may be a guard (gap) period 945 which may be used to allow the WTRU to transition from reception to transmission mode. Although the system may be flexible to support any DL:UL pattern, the pattern may repeat every K sub-frames, (hereafter referred to as a repeat K pattern), where K is a multiple of the number of HARQ processes used in the primary cell, (8 for an FDD LTE system). In such a case, the WTRU and the pico/femto cell may use modified HARQ and retransmission rules to send ACK/NACK feedback, as well as retransmissions, (e.g., as a result of a NACK reception).

For a repeat-8 pattern, the retransmissions may occur exactly a number (n+8) of sub-frames after the previous transmission. The HARQ feedback may be carried either on the primary cell, or it may be carried in the SuppCC. For the latter case, (use of SuppCC), the feedback may be bundled to deal with the UL/DL asymmetry.

Figure 10A:
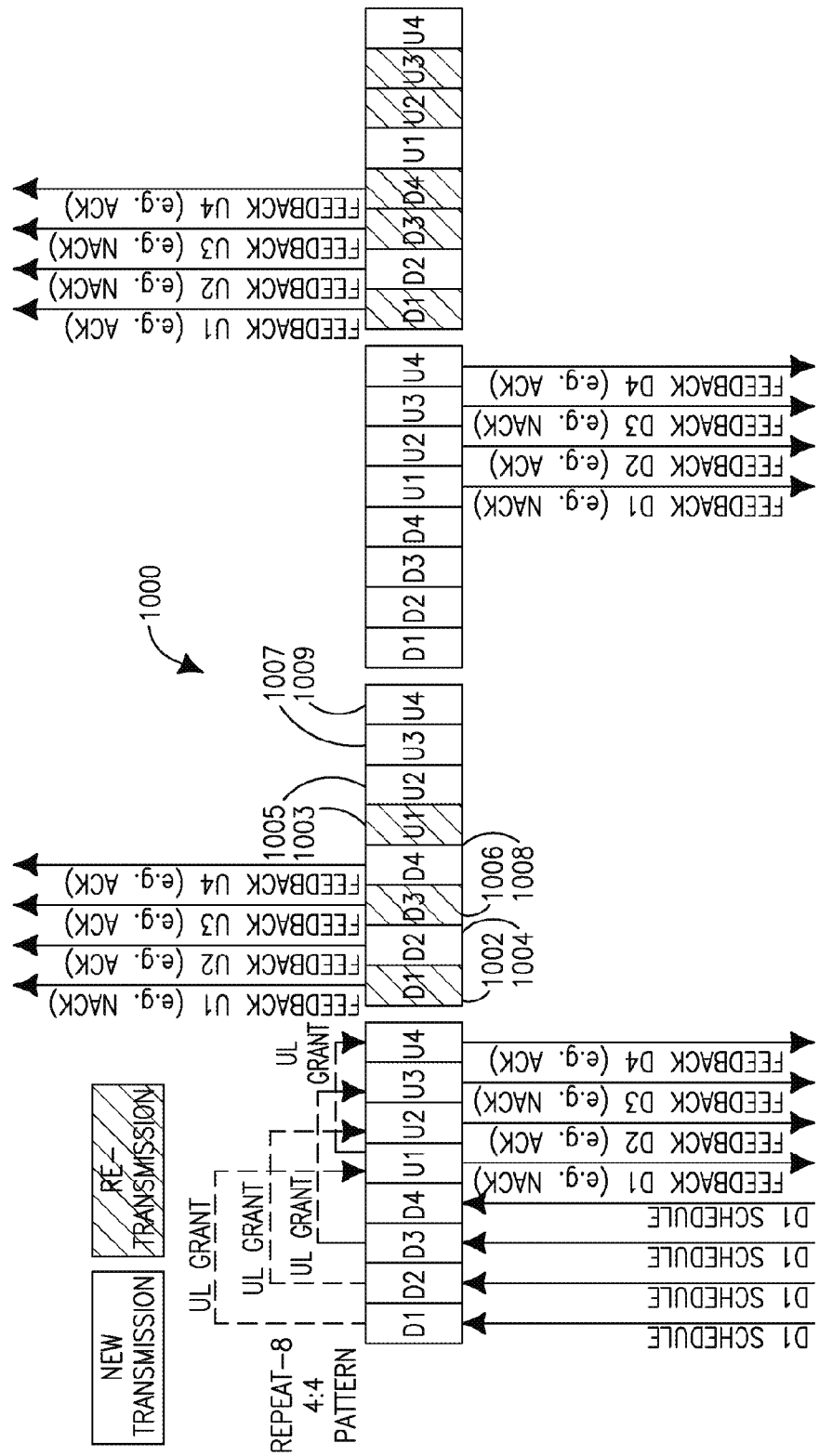
FIGS. 10A and 10B show examples of hybrid automatic repeat request (HARQ) details for repeat-8 patterns, (a primary cell with an HARQ round-trip-time (RTT) of 8 sub-frames)
Figure 10B:
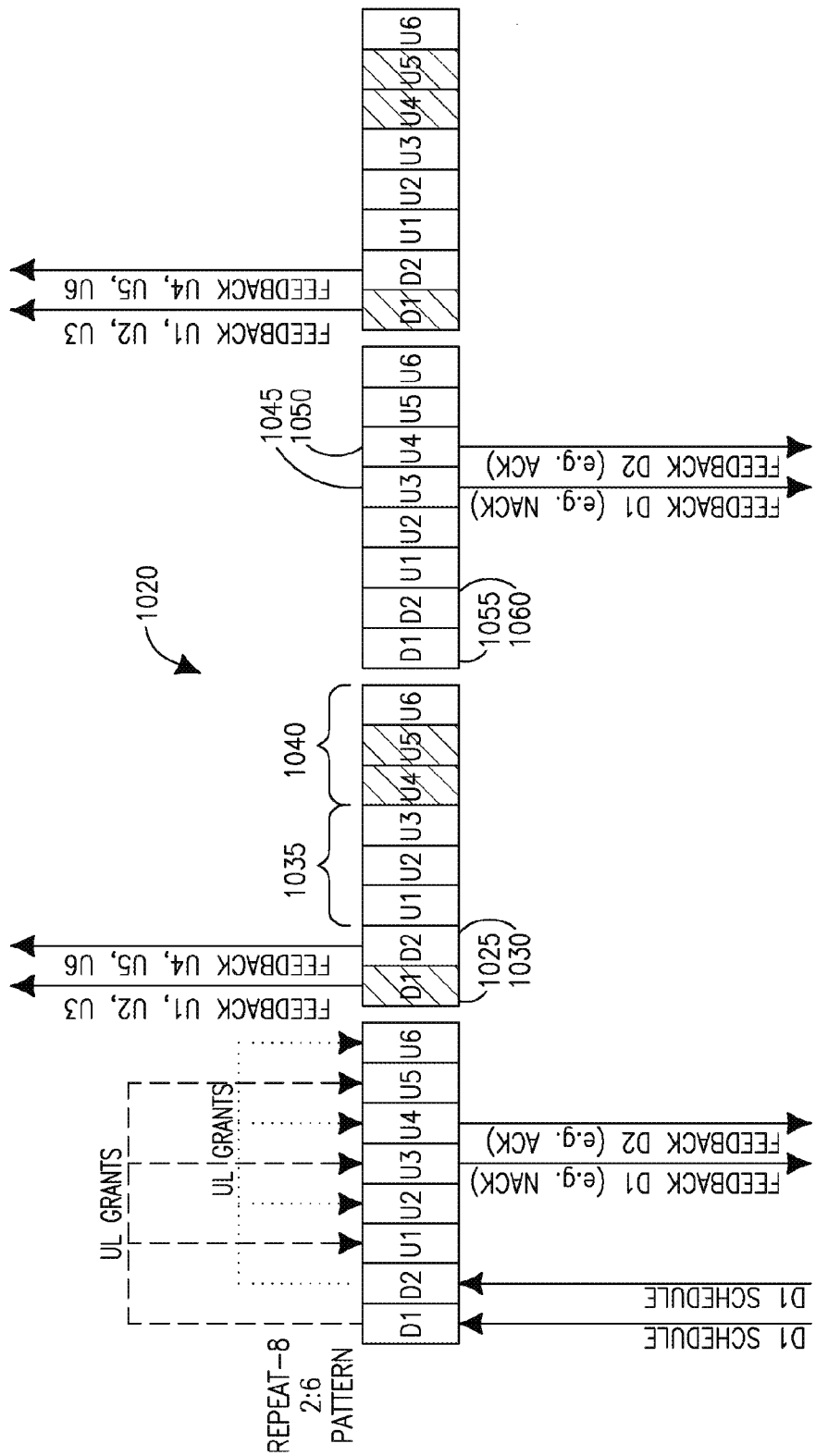

FIGS. 10A and 10B show examples of HARQ details for repeat-8 patterns, (a primary cell with an HARQ round-trip-time (RTT) of 8 sub-frames). FIG. 10A shows an example for DL:DL pattern of 4:4 and FIG. 10B shows an example for DL:DL pattern of 2:6. Although FIGS. 10A and 10B are discussed with respect to a primary cell, it is applicable to supplementary cells. In general, for the 4:4 pattern 1000, each DL subframe 1002, 1004, 1006, and 1008 may carry feedback for an UL subframe 1003, 1006, 1007 and 1009, respectively. This is also applicable for UL subframes carrying feedback information for DL subframes. Although FIGS. 10A and 10B are discussed with respect to a primary cell, it is applicable to supplementary cells as appropriate.

For the 2:6 pattern 1020, the feedback for the DL transmissions do not need to be bundled. However, the 2 DL sub-frames 1025 and 1030, (in each set of 8 sub-frames), need to carry feedback for 3 UL subframes 1035 and 1040, respectively. The UL HARQ feedback may be carried in a feedback channel, (e.g., a modified physical HARQ indicator channel (PHICH) for LTE), or in a new feedback channel visible to only WTRUs capable of carrier aggregation over LE bands. In the 2:6 pattern 1020, UL subframes 1045 and 1050 may carry feedback for DL subframes 1055 and 1060, respectively.

For the repeat-8 patterns, the DL control signaling, (DL scheduling and UL grants), may be carried on the primary cell relying on the timing rules for the primary cell and cross carrier scheduling. As shown in FIG. 10A for the 4:4 pattern, the DL scheduling information for frame "n" may be carried in frame "n". UL grants carried in frame n may be used to schedule future transmissions in frame "n+k", where k depends on the repeat-8 pattern. The value of k may be signaled with the grant, or derived implicitly, (e.g., based on a specific WTRU address for example a radio network temporary identity (RNTI), where k refers to grant for UL sub-frame k).

Alternatively, the DL control information may be carried on the DL sub-frames using a form of bundled grant. In this case, the DL sub-frames may have to provide UL grants for more than one UL sub-frame. As shown in FIG. 10B for the 2DL:6UL pattern, a DL sub-frame, for example subframe D1, may provide UL grants for 3 UL sub-frames, for example sub-frames U1, U3 and U5. This asymmetric pattern may require additional processing. For example, in 3rd Generation Partnership Project (3GPP) Release 10, the UL grant may contain an identity of the WTRU to whom the grant applies. For asymmetric shared mode operation, the UL grant may also have to contain an indication of the time at which this grant applies, (the grant received in frame n applies to UL sub-frame n+k). The value of k may be explicitly included in the grant information, (e.g. grant applies to WTRU 1 in sub-frame n+6). Alternatively, the value of k may be determined implicitly. For instance, a WTRU could be assigned 3 addresses, (radio network temporary identifier (RNTI_2), RNTI_4, and RNTI_6). Receiving an UL grant for RNTI_6 implies that the grant applies to this WTRU in frame n+6.

Figure 11A:
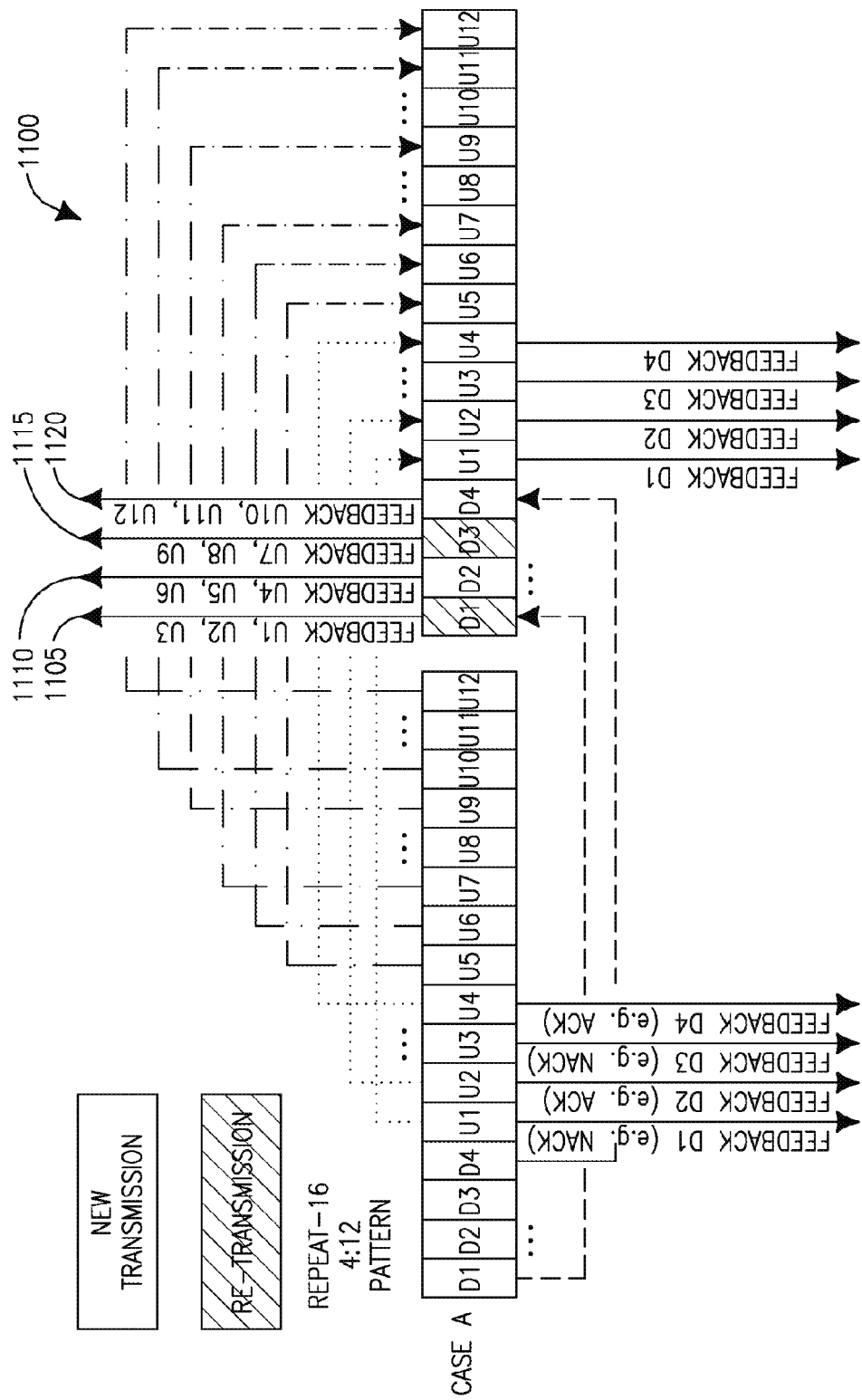
FIGS. 11A and 11B show examples of HARQ details for a repeat-16 pattern, (a primary cell with an HARQ RTT of 16 sub-frames)
Figure 11B:
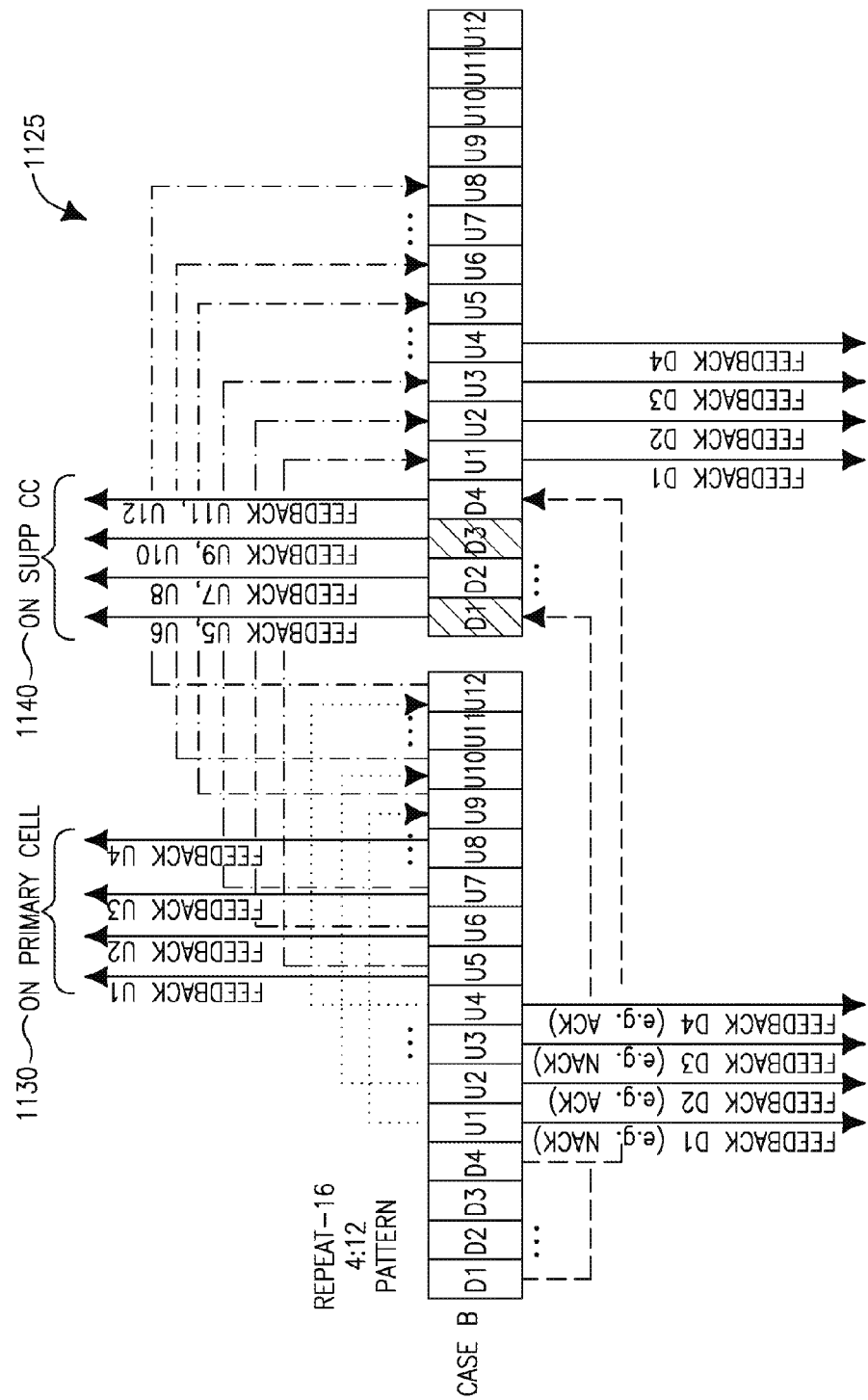

FIGS. 11A and 11B show examples of HARQ details for a repeat-16 pattern, (a primary cell with an HARQ RTT of 16 sub-frames). For a repeat-16 pattern, the retransmission schedule may be based on the sub-frame used for the initial transmission. FIG. 11A shows an example of a DL:UL 4:12 pattern 1100, where the HARQ feedback is carried on the SuppCC using bundled HARQs 1105, 110, 1115 and 1120, for example. The HARQ RTT is 16 sub-frames and would require an increase in the maximum number of HARQ processes. For example, the number of HARQ processes in the UL may be 12.

FIG. 11B illustrates an alternative feedback mechanism for DL:UL 4:12 pattern 1125, where all or part of the HARQ feedback may be carried in the primary cell. The feedback for UL sub-frames U1, U2, U3, and U4 are carried on the primary cell 1130. For example, the acknowledgement (ACK)/negative ACK (NACK) for the packet sent in the UL at subframe U1 is sent by the base station over the primary cell on the DL CC using the PIHCH 4 subframes after transmission of the packet. The feedback for UL sub-frames U5-U12 may be carried in the SuppCC 1140. For feedback carried on the primary cell, the FDD LTE "n+4" timing rules may be used. If the primary cell is used to carry feedback, it is possible to maintain the number of HARQ processes to 8. For this alternative approach, the WTRU and pico/femto cell may be aware of the HARQ RTT for each of the sub-frame, as well as where the feedback is being transmitted. For DL sub-frames 1-4, the RTT is 16 sub-frames. For UL sub-frames 1-4, the RTT is 8 sub-frames. For UL sub-frames 5-12, the RTT is 12 sub-frames.

Figure 12:
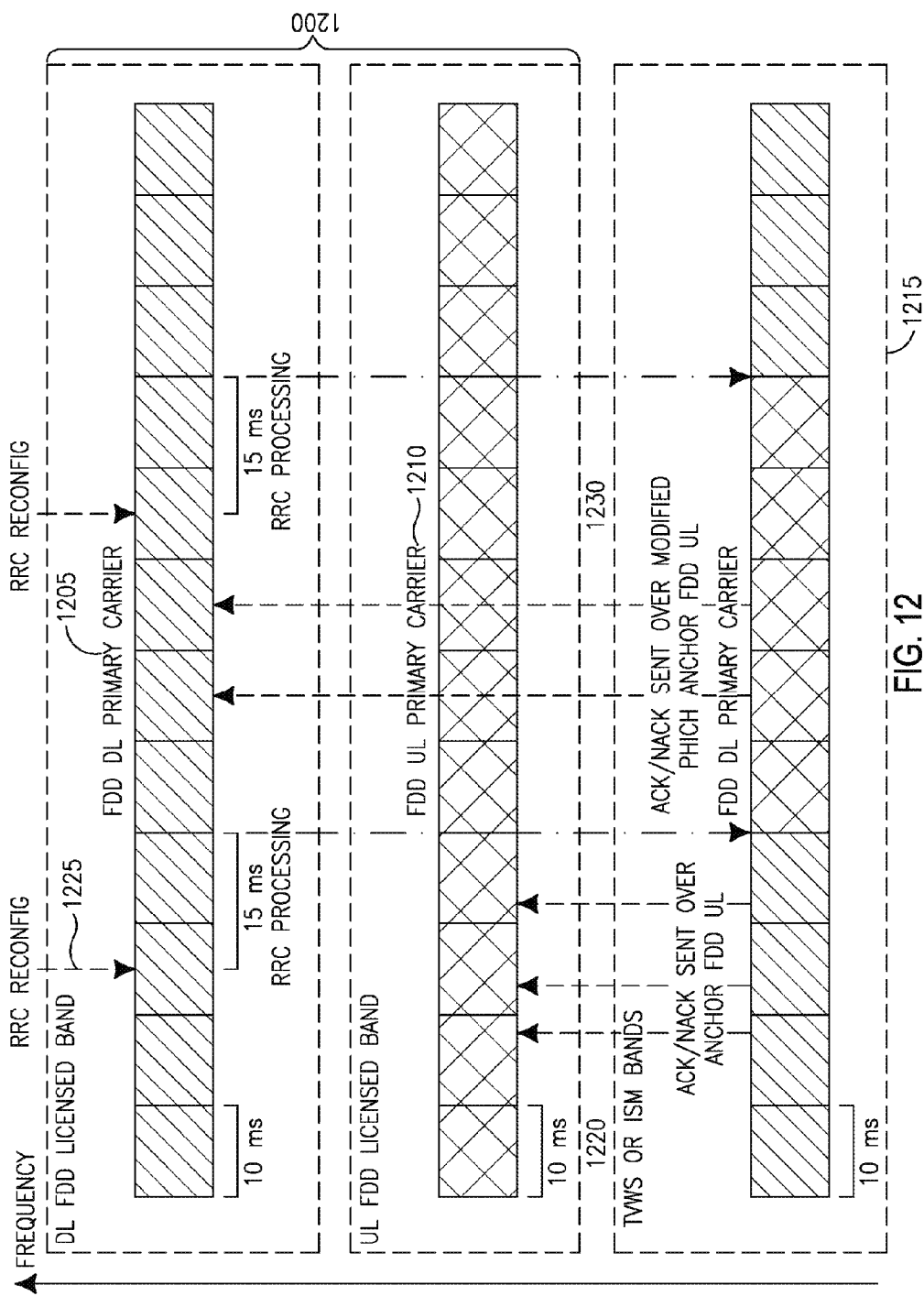
FIG. 12 shows an example of dynamically changing the direction of aggregation through a radio resource control (RRC) reconfiguration sent over a primary carrier.

Described herein are embodiments for dynamic control of the SuppCC. In one embodiment, the direction of the aggregation may be dynamically changed through an RRC reconfiguration sent over the primary carrier. FIG. 12 shows a cell 1200 that may include an FDD DL primary carrier 1205 operating in a DL FDD licensed band and an FDD UL primary carrier 1210 operating in an UL FDD licensed band. The cell 1200 is aggregated with a SuppCC 1215 operating in a LE band such as a TVWS or ISM band. Initially, the aggregation direction is in the UL direction 1220. A RRC Reconfiguration message 1225 is received. In general, LTE delivers and processes RRC messages within 15 ms in connected mode. The aggregation direction is then changed to the DL direction 1230.

Figure 13:
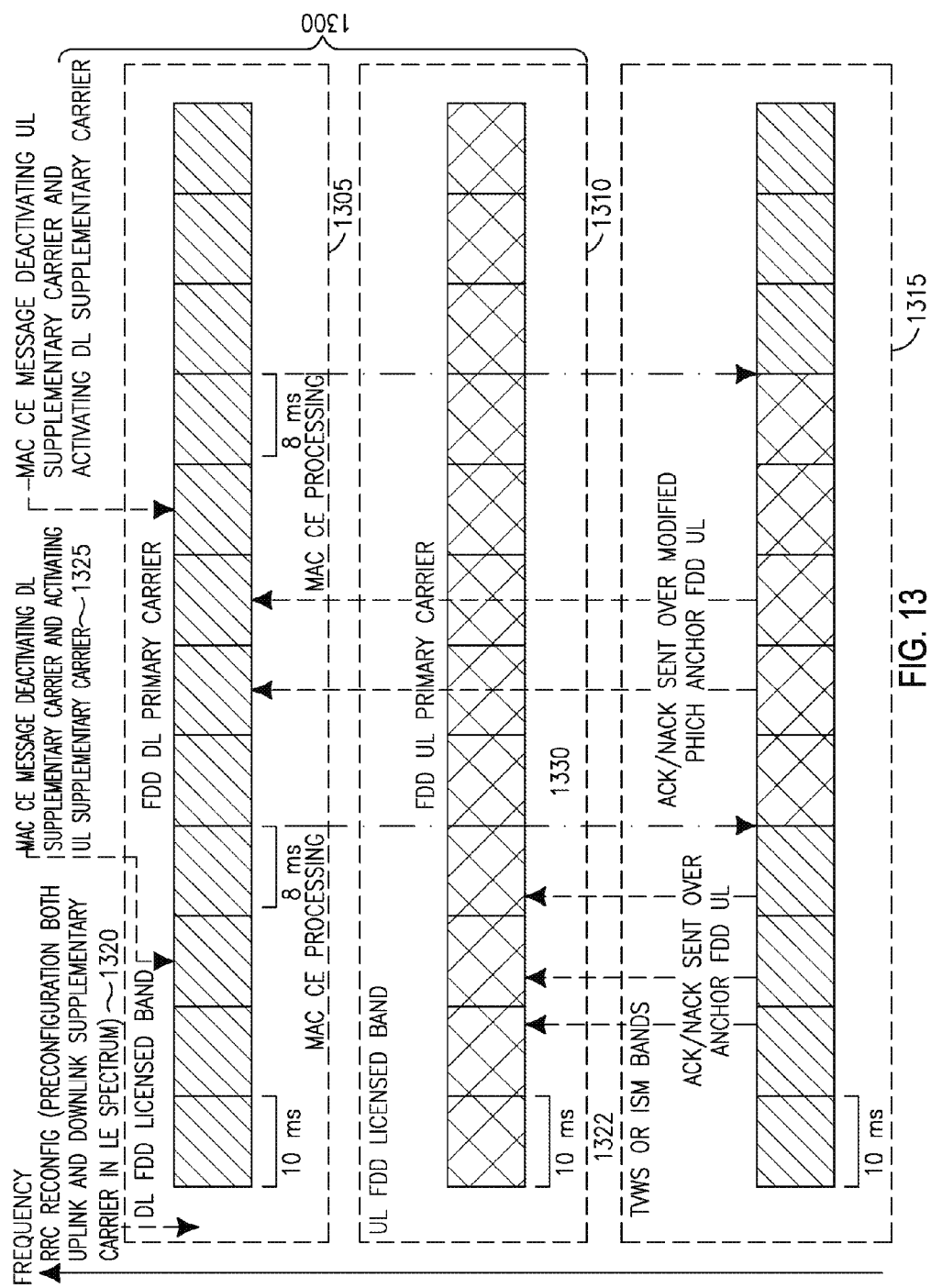
FIG. 13 shows an example of dynamically changing the direction of aggregation through a medium access control (MAC) control element (CE) command sent over a primary carrier.

In another embodiment, the direction of the aggregation may also be dynamically changed through a medium access control (MAC) control element (CE) command sent over the primary carrier. FIG. 13 shows a cell 1300 that may include an FDD DL primary carrier 1305 operating in a DL FDD licensed band and an FDD UL primary carrier 1310 operating in an UL FDD licensed band. The cell 1300 is aggregated with a SuppCC 1316 operating in a LE band such as a TVWS or ISM band. RRC reconfiguration messages 1320 may have preconfigured both UL and DL SuppCCs in the LE spectrum. Initially, the SuppCC 1315 may have aggregation activated in one direction 1322. A MAC CE message 1325 may subsequently activate a SuppCC 1315 aggregation in another direction 1330 and deactivate the SuppCC aggregation in the other direction 1322.

A new MAC scheduler and buffering scheme may be used to retain temporarily deactivated UL or DL MAC protocol data units (MPDUs) when switching the SuppCC from DL to UL, or vice versa. Note that both FDD carriers make aggregation synchronous and additional memory may not be required.

In addition, new guard periods (GPs) may be added for dynamic FDD prior to any transition of the SuppCC from DL to UL, or vice versa. This may apply also for any transitions from one operating mode to another, (e.g., from the DL-only operating mode to the UL-only operating mode). This guard period may be configured based on the range or size of the cell. It may also be changed/reconfigured dynamically via RRC reconfiguration messages.

PHICH may be transmitted on the DL carrier that was used to transmit the UL grant. The timing of responses to be expected on the PHICH may differ in FDD and TDD. For FDD, DL ACK/NACK may be sent 4 subframes after the UL transmission, but in TDD this may be variable. The mapping of PHICH resources may also differ. In FDD, all frames may have the same number of PHICH resource elements in the first orthogonal frequency division multiplexing (OFDM) symbol. In TDD, the number of PHICH resource elements may depend on the subframe. In TDD, the size of the PHICH may be adjusted based on the UL/DL configuration, (an UL-heavy configuration may have more resource elements allocated to the PHICH). PHICH collisions may be considered for the case of cross-carrier scheduling, (resolved by a demodulation reference signal (DMRS) cyclic shift mechanism).

Therefore, if an FDD carrier is used in white space, this could result in an UL heavy configuration with a potential for PHICH collisions. One possibility is to define an additional PHICH allocation which may be sent over the RRC reconfiguration message while configuring the SuppCC. These PHICH configurations may be changed when the SuppCC is reconfigured from UL to DL in order to adapt to the load, (either UL heavy or DL heavy), of the channel. The PDCCH in the licensed band, (allocation and configuration), may then be modified based on the new PHICH allocations that occur in the first OFDM symbol of each subframe.

When the unlicensed band carrier is set to DL only, the unlicensed band UL control information like channel quality indication (CQI)/precoding matrix information (PMI)/rank indication (RI), ACK/NACK/discontinuous transmission (DTX) may be sent over the primary carrier FDD UL. The format of the control information will include corresponding bit fields on FDD UL for that purpose.

Described herein is an FDD primary cell aggregating an TDD SuppCC In particular, a primary FDD carrier operating in a licensed band aggregates with a SuppCC operating in a LE band based on an existing LTE-TDD frame. Multiple UL and DL supplementary transmission opportunities may exist in each frame, depending on asymmetry configuration.

FIG. 14 shows an example of a licensed band FDD primary cell 1400 containing an UL CC 1406 and a DL CC 1410 aggregated with an TDD supplementary cell 1415, (may also be referred to as enhanced TDD supplementary cell and the term "enhanced TDD supplementary carrier" may be used in appropriate situations or as needed). The TDD supplementary cell 1415 may be treated by the system as additional bandwidth resources for both UL and DL. This additional resource may be used opportunistically by the base station if the RRM determines the need for it and an available channel may be found. When an TDD supplementary cell 1415 is activated by the RRM, the base station may have access to an additional TDD-like component cell with which aggregation may be performed. Effectively, DL carrier aggregation may occur over subframes in which the TDD supplementary cell is in the DL direction, and UL carrier aggregation may occur over subframes in which the TDD supplementary cell is in the UL direction. During a gap 1420, the TDD supplementary cell 1415 does not provide additional bandwidth for aggregation. Aggregation may be performed by combining one or more TDD supplementary cells with a licensed band PCC and zero or more SCCs.

The TDD supplementary cell 1415 and the FDD licensed carriers 1405 and 1410 may inherently have different timing relationships for various operations, most of them related to HARQ. In the case where the TDD supplementary cell 1415 and licensed carriers 1405 and 1410 operate independently, these timing relations may not have any impacts on the PHY and MAC layers of the system. However, to allow cross-carrier scheduling of resources on the TDD supplementary cell 1415 from the licensed band carriers 1405 and 1410, procedures do not currently exist, within the 3GPP standards to define the behavior of grants, retransmissions, and timing of power control commands.

In order to resolve the discrepancy in timing, an enhanced TDD supplementary cell 1415 may be used in which the procedures for HARQ timing and PHY control channels, (PDCCH, PUCCH, and PHICH), are described herein below. These procedures differ from those defined in the 3GPP standards for a standard TDD CC, and the differences may allow the enhanced TDD CC to function in the most efficient way with an FDD licensed LTE system.

For the enhanced TDD frame structure, a dynamic UL/DL configuration and dynamic frequency dependant guard period (GP), (shown as gap 1420), may be implemented. The TDD frame structure, (referred to as a frame structure type 2), defined in the 3GPP standards, provide 7 different fixed UL/DL configurations that may be used in a static fashion. Once configured, these configurations may be used for all WTRUs throughout the cell and may not change. In HeNB deployments, the number of WTRUs served by the HeNB may be quite smaller than a macro-cell deployment. Therefore, the traffic load, (UL, DL, or balanced), may change more frequently and in a more pronounced fashion. Since the TDD UL/DL configuration in 3GPP may be fixed, introducing a regular TDD component carrier in the LE bands results in some limitations in the efficiency of the bandwidth use relative to the traffic load.

One approach to mitigate the TDD limitation may be to dynamically change the configuration of UL/DL in TDD by sending to the active WTRU, through a RRC reconfiguration message or system information, the new configuration information. As a result, in the enhanced TDD supplementary cell, the RRM may control the UL/DL configuration of the enhanced TDD supplementary cell based on the traffic load at any given time. At any given time, one of the 7 UL/DL configurations may be used for the enhanced TDD supplementary cell in order to best suit the traffic load at the HeNB. For example, for a DL heavy traffic load, (several WTRUs performing heavy download of video, for example), the HeNB may configure UL/DL configuration 5 for the enhanced TDD supplementary cell. This may allow the UL/DL configuration to adjust to the traffic load over the cell.

The system information about the enhanced TDD supplementary cell UL/DL configuration would be sent by the PCC on the licensed band. Following the sending of the signaling representing the change in the UL/DL configuration, the base station may change the UL/DL configuration, (and therefore the sequence of transmit and receive subframes on the enhanced TDD supplementary cell), after a certain number of subframes. Potential candidates for the switching time may be the frame boundary or the arrival of the first special subframe on the enhanced TDD supplementary cell. These switch points may avoid the switching from DL to UL that may occur when a configuration is changed dynamically. Other switch points that avoid a DL to UL transition may also be possible, and the signaling which indicates the change of the UL/DL configuration may potentially define the switch time as part of the messaging.

Idle mode WTRUs may not be impacted by a change in UL/DL configuration, as camping on the primary carrier or multiple UL/DL configurations may be preconfigured through an RRC message and activated by a MAC control element (CE) message. In addition, since carrier aggregation is not used in idle mode, the change of the UL/DL configuration on these WTRUs may be transparent until RRC connection, (at which time they receive the current UL/DL configuration to be used). The UL/DL configuration of all configured TDD supplementary cells may be signaled at the time of RRC connection. Any changes to the UL/DL configuration may be signaled through an RRC reconfiguration or through a dedicated SIB, (since the UL/DL configuration may be applied to the entire system utilizing the LE bands).

As illustrated in FIG. 14, TDD may require a gap (GP) 1420 in the special sub frame 1422, (where a Downlink Pilot Timeslot (DwPTS) 1424 and an UL Pilot Timeslot (UpPTS) 1426 are included for configuration and processing purposes), to avoid interference during switching between UL and DL. In the enhanced TDD supplementary cell, the GP duration may be configurable through RRC reconfiguration or system information change to allow for the configuration to dynamically adjust to the range of the TDD supplementary cell as well as the frequency band of the unlicensed spectrum being used, (the propagation characteristics of the signal may change as the frequency is changed). A preconfigured GP value per frequency band is also possible. This preconfigured GP may be based on the expected cell size and propagation characteristics over the LE channel in question, and be modified by an RRC message when the frequency band of the supplementary carrier is changed.

For the HARQ entity on the enhanced TDD supplementary cell, the FDD HARQ timing may be used to define the operations of grants, acknowledgements, and retransmissions on the supplementary carrier. In order to allow the use of FDD-like timing for these operations on the supplementary carrier, the presence of the PHY-layer control channels present on the licensed carriers (PCC and SCC) may be leveraged. Unlike a pure TDD system, the PHY-layer control channels on the licensed FDD carriers may be present on every subframe and may therefore be leveraged to allow FDD timing for operations involving the enhanced TDD supplementary cell. In order to allow this, the use of the PHY control channels on the enhanced TDD supplementary carrier may be restricted so that the enhanced TDD supplementary cell may not carry a PHICH channel, and all acknowledgements to UL transmissions made by the WTRU may be sent only on the PCC or SCC. The enhanced TDD supplementary cell may not carry a PUCCH channel. The PUCCH may be transmitted on the PCC only. The PDCCH may or may not be transmitted on the TDD supplementary cell. FIG. 15 shows the physical channels that are supported on each carrier of a system supporting a licensed exempt operation.

UL grants addressed to the enhanced supplementary carrier may be sent four subframes prior to when the grant takes effect. These grants may be sent using the PDCCH on either the PCC/SCC, (assuming cross-carrier scheduling), or on the supplementary carrier itself. When cross-carrier scheduling is used, downlink control information (DCI) format 0 is used to send the grant and may contain a carrier indication field (CIF) to indicate the enhanced supplementary carrier that carries the grant. The scheduler may ensure that an UL grant is never sent four subframes prior to a DL subframe on the enhanced TDD supplementary cell. These rules apply for both PDCCH sent on the PCC/SCC and PDCCH sent on the supplementary carrier.

As in regular TDD. DL allocations for resources on the enhanced TDD supplementary cell may be sent on the same subframe where the allocation takes place, and may therefore be sent on a subframe where the supplementary carrier is a DL or special subframe.

The presence of control channels on every subframe, (due to leveraging the licensed band), may allow a system aggregating an enhanced TDD supplementary cell to send ACK/NACK n+4 subframes following the actual data transmissions in both UL and DL. Although ACK/NACK may be sent for data transmissions from the enhanced TDD supplementary carrier after 4 subframes of the transmission, other values for a fixed data to ACK delay may also be possible.

For DL transmission on the supplementary carrier, ACK/NACK may be sent on either the PUCCH on the PCC or the physical UL shared channel (PUSCH), (if a PUSCH is allocated in the given subframe). Due to the availability of UL subframes on the PCC, the WTRU may send ACK/NACK according to FDD timing. As with LTE Release 10, PUSCH may be leveraged for sending ACK/NACK if a PUSCH is present in the subframe where the feedback must be sent. The supplementary carrier PUSCH may also be used to send ACK/NACK if PUSCH is not allocated to the particular WTRU on PCC or SCC but is allocated on the enhanced supplementary carrier for that subframe.

For UL transmission on the supplementary carrier, ACK/NACK may be sent on the PHICH of the PCC or SCC. Due to the presence of DL subframes on the PCC/SCC, the base station may send ACK/NACK using the FDD) timing. The PHICH may not be present on the supplementary carrier due to the presence of UL subframes that do not carry the PHICH and may limit the ability to transmit ACK/NACK using the FDD timing.

Since retransmissions on the supplementary carrier depend on the presence of a DL or UL subframe on those retransmissions, the n+4 FDD timing may not be applied in the case of retransmissions.

Physical random access channel (PRACH) procedures and structure in TDD may be quite different from FDD. The PRACH procedures in LTE may consist of 6 resource blocks (RBs) adjacent to the PUCCH in predetermined subframes. For a given PRACH configuration (from SIB2), mapping to specific subframes is different in TDD versus FDD. In FDD, there may be at most one PRACH available per subframe. In TDD, there may be multiple PRACH resources in a given subframe, (to account for fewer UL subframes in a frame). The offset between RACH resources in a subframe may be given by upper layers. Preamble format 4 may be used only in TDD, (short preamble used to fit into an UL pilot timeslot (UpPTS) of the special subframe).

For a system aggregating with an enhanced TDD supplementary cell, the PRACH may be implemented in the primary cell which may be FDD. Therefore, the configuration, timing, and procedure for PRACH may follow the FDD case. However, the network may trigger an additional PRACH procedure that is initiated on the supplementary carrier in the event that timing alignment between primary and supplementary carriers may be significantly different due to large frequency separation. In this case, RRC reconfiguration associated to adding the supplementary carrier may need to define the specific RACH configuration to be used on the supplementary carrier which may include an TDD RACH procedure. The RRC configuration that is sent over the FDD carrier may specifically indicate that the RACH configuration is specific to the TDD carrier. This particular type of RACH may be triggered when the WTRU has data to send to the base station, or when the base station has detected a timing drift, between the primary and supplementary carriers.

When performing PRACH on the TDD supplementary carrier, contention resolution may take place on either the primary or supplementary carriers in order to ensure a larger number of available PRACH resources for the system.

Timing of UL power control for a PUSCH relative to a transmit power control (TPC) command is different in TDD and FDD. A new entity may be added in the base station that is aware of the timing difference between the power control changes on the TDD and FDD carriers and applies the appropriate transmit power control (TPC) command. If cross carrier scheduling is supported. TPC commands for FDD or TDD may be differentiated by adding a field to the PDCCH for a TPC command or using a carrier specific schedule for TPC.

TDD may support bundling of multiple ACK/NACKs into a single ACK/NACK to be sent in the UL subframe. FDD may not support this mode, (single ACK is sent for each received transport block). ACK/NACK bundling may be controlled by the downlink assignment index (DAI) sent in the DCI on the PDCCH (2 bits). These two bits may not be present in FDD mode DCI formats. When multiple serving cells are configured, ACK/NACK bundling may not be performed, (but multiplexing may still be possible). ACK/NACK repetition, (configured by upper layers), in TDD mode may be applied for ACK/NACK bundling and not for ACK/NACK multiplexing.

Cross-carrier scheduling of DL resources on the TDD supplementary carrier may be allowed via the FDD carrier. For cross carrier scheduling, the FDD carrier may need to include the DAI in the DCI format. Additional complexity in blind decoding of PDCCH may be required. Because ACK/NACK may be sent on PUCCH, bundling may need to be supported on the FDD UL carrier, (the base station may need to be able to decode the PUCCH related to the bundled information). As a result, the bundling operation may be performed relative to the transport blocks received in the TDD supplementary carrier, but the bundled ACK/NACKs may be sent over the FDD carriers. In addition, sending the bundled ACK/NACK over the TDD supplementary carrier may be supported as well, using PUSCH. This is due to the fact that, in a combined TDD/FDD design, ACK/NACK may not be sent only on the primary carrier. Instead, ACK/NACK may be sent on a secondary carrier if there is a PUSCH allocated on it, but no PUSCH on the primary carrier.

Periodicity and timing of the sounding reference signal (SRS) may be controlled by upper layer parameters and may be different between TDD and FDD. An SRS may be transmitted in UpPTS in TDD, (UpPTS may be reserved for SRS and format 4 PRACH). Different sub-frame configurations may be sent for each carrier when both TDD and FDD are configured, (i.e., an TDD supplementary carrier or cell, as appropriate). This additional SRS configuration may be sent over the primary carrier. Fields may therefore be added to the SRS configuration to identify whether the configuration corresponds to TDD or FDD.

In contrast to FDD, in TDD, special frames may not have PUCCH mapped to them. The PUCCH may be transmitted on the primary cell in an FDD fashion.

For CA, a PHICH may be transmitted on the DL carrier that was used to transmit the UL grant. The timing of responses to be expected on the PHICH may differ in FDD and TDD. For FDD, a DL ACK/NACK may be sent 4 subframes after the UL transmission, and in TDD this may be variable. The mapping of PHICH resources may also differ. In FDD, all frames may have the same number of PHICH resource elements in the first OFDM symbol. In TDD, the number of PHICHs may depend on the subframe. In TDD, the size of the PHICH may be adjusted based on the UL/DL configuration, (UL-heavy configuration may have more resource elements allocated to PHICH). PHICH collisions may be considered for the case of cross-carrier scheduling, (resolved by demodulation reference signal (DMRS) cyclic shift mechanism).

A PHICH may be sent on the licensed band, (in order to ensure n+4 timing for ACK/NACK on the enhanced TDD supplementary carrier). New procedures may be required in order to define the PHICH resources on the licensed band when scheduling of the supplementary carrier is performed by the PDCCH on the supplementary carrier. A default licensed carrier (the PCC) may be chosen for sending the PHICH in this case, and the scheduler may avoid PHICH collisions through smart scheduling. Alternatively, the PHICH may be sent on the supplementary TDD carrier, (to make use of the adjustable PHICH resources available on this carrier), if the n+4 HARQ timing is not assumed.

Some DCI Formats on PDCCH may be different between TDD and FDD, (e.g., DCI format 1 for FDD may be 3 bits for a HARQ process and 2 bits for DAI, while 4 bits for an HARQ process and no bits for DAI, for TDD). If cross carrier scheduling is being used on the primary carrier, a new PDCCH search space may be allocated in order to decode both TDD and FDD DCI formats which may be separate from the FDD PDCCH search space. This may simplify blind decoding of the PDCCH.

Uplink grants may be signaled by the PDCCH using DCI format 0. In FDD, an UL grant may start 4 subframes after DCI format 0 is received, (DCI format 0 may also be different for TDD/FDD). In TDD, the UL index in DCI format 0 may specify the timing of the grant. In order to do cross-carrier scheduling in the UL with a LE supplementary TDD carrier, a new TDD DCI format 0 may be used to be better aligned with the FDD DCI format. The information from the DCI sent on the FDD carrier may specify both whether the UL grant is specific to the FDD or TDD carrier, and when it may be scheduled when it is specific to the TDD carrier.

To support DL heavy CA configurations, PUCCH format 3 may be used to allow a larger number of bits for ACK/NACK, (when format 1b with channel selection does not have sufficient bits for the required ACK). In FDD, 10 bits may be allocated in PUCCH format 3. In TDD, 20 bite may be allocated in PUCCH format 3. The ACK/NACK may be treated for supplementary TDD carrier as an FDD supplementary carrier. There may not be a need to implement ACK/NACK bundling, as it is the case for TDD, as there is always an UL FDD carrier active (primary carrier) in this approach.

If an TDD carrier is used, the way in which system information may be interpreted for CQI reporting may have to be different for the TDD or FDD carrier, (alternatively, separate system information (SI) for FDD and TDD may be needed). Mixing TDD and FDD may be more complex for the scheduler as well, which may need to be able to handle two different schedules of TDD and FDD to come up with the DL allocation decisions. Upper layer event reporting and measurements may also need to be modified given different timing for CQI reports coming from the TDD and FDD carrier.

Described herein are coexistence embodiments. Spectrum sharing among secondary users may require an effective use of the LE bands. If it is not coordinated well, the bands may be either left unoccupied, resulting in a waste of frequency bands, or heavily accessed by secondary users, causing significant interference with each other. Therefore, a well designed coexistence mechanism is desirable to enable an effective usage of the LE bands and improve the communication quality of the secondary networks.

Referring back to FIG. 1, a database enabled coexistence solution may be incorporated in a network including a coexistence manager 570 and a policy engine 574 that may be used to coordinate opportunistic use of LE bands with other secondary users/networks. The coexistence manager 670 of a given network may include interfaces to the TVWS database 525 and coexistence database 572, network devices and coexistence managers of other networks. Location based LE band allocations may either be distributed to base stations/HeNBs or centralized at the core network. The policy engine 574 may generate and enforce polices based on database information and operator defined rules.

A centralized hierarchical coexistence database management solution maybe used. A local database, for example coexistence database 572 in FIG. 5, which may be core network based, may be used to coordinate secondary usage within a given operators network, while an Internet based database may be used to coordinate secondary usage with external users/networks. Alternatively, a distributed approach may be implemented where there is no centralized entity to make spectrum allocation decisions. In this approach, the eNB/HeNB may be responsible for accessing the coexistence database, processing the spectrum sharing negotiation with neighbor eNB/HeNBs, and making spectrum allocation decisions.

A spectrum sensing coexistence solution may be implemented where the network may rely on spectrum sensing results to coexist with other secondary networks. For this approach, a new entity, for example sensing co-processor/enhanced sensing 550 in FIG. 5, at the eNB/HeNB may negotiate access to LE bands by exchanging sensing and channel occupancy information with neighboring eNB/HeNBs. Alternatively, a centralized approach may be implemented based on spectrum sensing where a central entity in the core network may process the spectrum sensing results received from eNBs/HeNBs and make decisions about eNB/HeNB channel assignments.

A contention based coexistence solution may be implemented by performing carrier sensing for clear channel assessment (CCA) prior to commencing with transmissions. The eNB may maintain control of grant and scheduling of transmission opportunities. However, transmissions may be "gated" by the CCA.

Described herein is supplementary cell configuration and activation at an HeNB. Once the HeNB decides that it may activate a new supplementary cell, as the operating cells controlled by the HeNB are experiencing congestion, it first may seek the channel usage information from the coexistence manager, which is triggered by a spectrum request. The spectrum allocation of the HeNB may select the channel which triggers within the DSM RRM a series of events to correctly configure and activate the new supplementary cell. Cell configuration at the HeNB refers to determining all the cell parameters including defining the resources to be used as well as configuring the different LTE protocol layers for that specific cell in the HeNB. Cell activation at the HeNB refers to starting the transmission and reception at the HeNB.

The configuration phase of the supplementary cell may determine the type of channels it will operate in, (sublicensed, available or PU assigned), determine the requirement of coexistence gaps, configure the sensing toolbox of the HeNB, select the amount of resources allocated to UL and DL, (i.e., TDD configuration no. 1-7 if an TDD frame structure; operating mode DL only, UL only or shared if an FDD frame structure). In the case of an TDD frame structure, a transmitting power level is determined, and RRM functions to consider the new SuppCC as a new resource, (packet scheduler, radio bearer control (RBC), and the like), may be configured. Transmission/reception in the supplementary cell may be started. Although mandatory control information transmitted over the supplementary cell may be reduced, some control information such as PSCH and SSCH may be still required to be broadcast. A cell activation procedure for a set of connected WTRUs may be initiated.

Once the HeNB decides that is may release a supplementary cell, as the operating cells controlled by the HeNB are experiencing less load, the supplementary cell is experiencing an unacceptable level of interference, a primary user was detected in the case of a PU assigned channel or it receives a request from the CM to evacuate the channel, this may trigger within the DSM RRM a series of events to correctly release the new supplementary cell. RRM functions to consider that the resources associated with the released SuppCC are no longer available, (packet scheduler, RBC, and the like), may be configured. A deactivation command (e.g., MAC CE command), may be sent to all connected WTRUs currently active on this supplementary cell. An RRC reconfiguration may be sent to all current configured WTRUs on this supplementary cell to release the supplementary cell. The CM may be informed that the supplementary cell is released. New requirements may be determined for measurement gaps. A sensing toolbox of the HeNB may be configured, and the transmitting/receiving on the supplementary cell may be stopped.

EMBODIMENTS

1. A method of aggregating carriers, comprising providing an aggregating cell configured for operation in a frequency division duplex (FDD) licensed spectrum.

2. The method of embodiment 1, further comprising aggregating the aggregating cell with at least one licensed exempt (LE) supplementary cell operating in a time sharing mode for uplink (UL) and downlink (DL) operations.

3. The method of any of the above embodiments, wherein the at least one LE supplementary cell is an FDD supplementary cell dynamically configurable between an UL only mode, a DL only mode, and a shared mode to match requested UL and DL traffic ratios.

4. The method of any of the above embodiments, wherein for the shared mode, the at least one LE supplementary cell is toggled between UL and DL at a toggling interval to match requested UL and DL traffic ratios.

5. The method of any of the above embodiments, wherein a sharing mode pattern is based on sub-frame timing.

6. The method of any of the above embodiments, wherein a sharing mode pattern repeats at a multiple of a number of hybrid automatic repeat request (HARQ) processes used by the aggregating cell.

7. The method of any of the above embodiments, wherein HARQ feedback is transmitted on one of the aggregating cell and the LE supplementary cell.

8. The method of any of the above embodiments, wherein HARQ feedback is bundled.

9. The method of any of the above embodiments, wherein a configuration change is triggered by one of a radio resource control (RRC) message, a medium access control (MALC) control element (CE) command transmitted over the aggregating cell or a dedicated system information block (SIB) transmitted over the aggregating cell.

10. The method of any of the above embodiments, wherein multiple LE supplementary cells are one of independently or dependently configured.

11. The method of any of the above embodiments, wherein the at least one LE supplementary cell is a time division duplex (TDD) supplementary cell.

12. The method of any of the above embodiments, wherein the TDD supplementary cell is dynamically configurable between multiple TDD configurations a given number of sub-frames after configuration change signaling.

13. The method of any of the above embodiments, further comprising providing a guard period for UL/DL to DL/UL transitions that is dynamically configurable based on at least one of frequency, range, or size of the TDD supplementary cell.

14. The method of any of the above embodiments, wherein timing for grants and hybrid automatic repeat request (HARQ) feedback is based on the aggregating cell FDD timing.

15. The method of any of the above embodiments, wherein the aggregating cell transmits at least one of HARQ feedback, grants and channel state information for the TDD supplementary cell.

16. The method of any of the above embodiments, further comprising triggering additional random access resources on the TDD supplementary cell on detecting a timing drift between the TDD supplementary cell and the aggregating cell.

17. The method of any of the above embodiments, further comprising providing a coexistence capability for coordinating operations between the LE supplementary cell with at least one of other networks and users operating in a same LE channel.

18. The method of any of the above embodiments, further comprising providing coexistence gaps to permit the other networks and users operating in the same LE channel as the LE supplementary cell to access the same LE channel.

19. A base station for licensed exempt spectrum aggregation, comprising a dynamic spectrum management radio resource manager (RRM) configured to receive cognitive sensing results from a sensing toolbox and to configure operation of the sensing toolbox.

20. The base station of embodiment 19, further comprising the RRM configured to control physical layer and a medium access layer configurations that provide coexistence gaps to permit other networks and users operating in a same licensed exempt (LE) channel as a LE supplementary cell to access the same LE channel.

21. The base station of any of embodiments 19-20, further comprising the RRM configured to control a radio resource controller configuration to detect primary users and transition between different frequency division duplex (FDD) modes or time division duplex (TDD) uplink and downlink configurations.

22. The base station of any of embodiments 19-21, further comprising a coexistence enabler interface configured to communicate between a coexistence manager and cognitive networks, wherein coexistence manager reconfiguration commands are translated into network-specific reconfiguration commands and transmitted to the cognitive network for reconfiguration, wherein the RRM receives translated coexistence manager reconfiguration commands from the coexistence enabler interface.

23. A wireless transmit/receive unit, comprising a radio resource controller (RRC) and a medium access controller (MAC) configured to receive configuration messages, the RRC and MAC being configured to provide coexistence gaps to permit other networks and users operating in a same LE channel as a LE supplementary cell to access the same LE channel, wherein a physical layer is configured by one of the RRC or MAC according to the configuration message.

24. The WTRU of embodiment 23, further comprising the RRC being configured to control a sensing toolbox to perform cognitive sensing measurements and support the coexistence gaps for primary/secondary user detection.

25. The WTRUI of any of embodiments 23-24, further comprising the RRC being configured to detect primary users and transition between different frequency division duplex (FDD) modes or time division duplex (TDD) uplink and downlink configurations.

26. A management system, comprising a coexistence manager (CM) entity configured to manage inter-base stations as well as inter-operator coexistence operation.

27. The management system of embodiment 25, further comprising the CM configured to receive sensing and usage data, and licensed exempt (LE) spectrum information.

28. The management system of any of embodiments 26-27, further comprising the CM configured to process and forward the usage data to requesting base station.

29. The management system of any of embodiments 26-28, further comprising the CM configured to maintain a map of networks to identify conflicts and coexistence operations based on at least the sensing and usage data, and LE spectrum information.

30. The management system of any of embodiments 26-29, further comprising the CM configured to transmit LE availability information based on at least the sensing and usage data, and the LE spectrum information.

31. The management system of any of embodiments 26-30, wherein a ranking of available channels is sent to the base station.

32. A method comprising communicating via a primary carrier and a secondary carrier.

33. The method of any of embodiments 1-18 and 32, wherein the primary carrier is in the FDD licensed spectrum and the secondary carrier is in the licensed exempt spectrum.

34. The method of any of embodiments 1-18 and 32-33, further comprising dynamically changing the supplementary carrier to aggregate in the downlink or uplink.

35. The method of any of embodiments 1-18 and 32-34, further comprising dynamically changing the direction of aggregation through a MAC CE command.

36. The method of any of embodiments 1-18 and 32-35, wherein the MAC CE command activates the supplementary carrier in one direction and deactivates it in another.

37. The method of any of embodiments 1-18 and 32-36, further comprising providing a guard period (GP) for dynamic FDD priory to a frame boundary when switching the supplementary carrier from DL to UL or vice versa.

38. The method of any of embodiments 1-18 and 32-37, wherein the GP is configured based on the range or size of a cell.

39. The method of any of embodiments 1-18 and 32-38, wherein the GP is configured dynamically via RRC signaling.

40. The method of any of embodiments 1-18 and 32-39, further comprising providing a PHICH allocation sent over the RRC reconfiguration message while configuring the supplementary carrier.

41. The method of any of embodiments 1-18 and 32-40, wherein the PHICH configurations are changed when the supplementary carrier is reconfigured.

42. The method of any of embodiments 1-18 and 32-41, wherein the PDCCH in the licensed band is modified based on PHICH allocations.

43. The method of any of embodiments 1-18 and 32-42, wherein on a condition that an unlicensed band carrier is set to DL only, the unlicensed band UL control information is sent over the primary carrier.

44. The method of any of embodiments 1-18 and 32-43, further comprising dynamically changing the configuration of UL/DL in TDD using an RRC reconfiguration message.

45. The method of any of embodiments 1-18 and 32-44, further comprising providing a GP in the special sub frame for the TDD supplementary carrier.

46. The method of any of embodiments 1-18 and 32-45, further comprising dynamically adjusting to the range of the cell as well as the frequency band of the unlicensed spectrum being used.

47. The method of any of embodiments 1-18 and 32-46, further comprising providing a preconfigured GP value per frequency band.

48. The method of any of embodiments 1-18 and 32-47, wherein periodicity and timing of a Sounding Reference Signal (SRS) are controlled by upper layer parameters and are different between TDD and FDD.

49. The method of any of embodiments 1-18 and 32-48, further comprising sending different subframe configurations for each carrier when both TDD and FDD configured.

50. The method of any of embodiments 1-1.8 and 32-49, further comprising transmitting the PUCCH only on the primary cell in an FDD fashion.

51. The method of any of embodiments 1-18 and 32-50, further comprising triggering additional PRACH on the supplementary carrier.

52. The method of any of embodiments 1-18 and 32-51, wherein an RRC configuration that is sent over the FDD carrier indicates the RACH configuration is specific to the TDD carrier.

53. The method of any of embodiments 1-1.8 and 32-52, wherein during performance of a PRACH on the secondary carrier (TDD), contention resolution occurs on either the primary or supplementary carrier in order.

54. The method of any of embodiments 1-18 and 32-53, further comprising providing a new entity in the eNB that is aware of the timing difference between the power control changes on the TDD and FDD carriers and applying the appropriate TPC command.

55. The method of any of embodiments 1-18 and 32-54, further comprising allowing cross-carrier scheduling of downlink resources on the TDI) supplementary carrier via the FDD carrier.

56. The method of any of embodiments 1-18 and 32-55, further comprising sending bundled ACK/NACKs over the primary carrier.

57. The method of any of embodiments 1-18 and 32-56, further comprising sending bundled ACK/NACK over the secondary carrier.

58. The method of any of embodiments 1-18 and 32-57, further comprising send the PHICH on the supplementary TDD carrier.

59. The method of any of embodiments 1-18 and 32-68, further comprising allocating a new PDCCH search space in order to decode both TDD and FDD DCI formats which will be separate from the FDD PDCCH search space.

60. The method of any of embodiments 1-18 and 32-59, wherein UL grants are signaled by the PDCCH using DCI format 0.

61. The method of any of embodiments 1-18 and 32-60, further comprising providing a new TDD DCI format 0 better aligned with the FDD DCI format.

62. The method of any of embodiments 1-18 and 32-61, further comprising treating to treat ACK/NACKs for supplementary TDD carrier as an FDD supplementary carrier.

63. The method of any of embodiments 1-18 and 32-62, wherein upper layer event reporting and measurements are modified given different timing for CQI reports coming from the TDD and FDD carrier.

64. The method of any of embodiments 1-18 and 32-63, further comprising providing a Coexistence Manager and Policy Engine to coordinate opportunistic use of Licensed Exempt bands with other secondary users/networks.

65. The method of any of embodiments 1-18 and 32-64, wherein the Coexistence Manager of a given network includes interfaces to the TVWS/Coexistence databases, network devices and Coexistence Managers of other networks.

66. The method of any of embodiments 1-18 and 32-66, further comprising a Policy Engine to generate and enforce polices based on database info and operator defined rules.

67. The method of any of embodiments 1-18 and 32-66, wherein a new entity at the eNB/HeNB negotiates access to Licensed Exempt bands.

68. The method of any of embodiments 1-18 and 32-67, wherein carrier sensing is performed for Clear Channel Assessment (CCA) prior to commencing with transmissions.

69. A method of aggregating carriers comprising a frequency division duplex (FDD) primary cell aggregating a supplementary carrier.

70. The method of any of embodiments 1-18, 32-67 and 69, wherein the supplementary carrier is a dynamic FDD supplementary carrier.

71. The method of any of embodiments 1-18, 32-67 and 69-70, wherein the supplementary carrier is a licensed exempt carrier.

72. The method of any of embodiments 1-18, 32-67 and 69-71, wherein the supplementary carrier is a time division duplex (TDD) supplementary carrier.

73. The method of any of embodiments 1-18, 32-67 and 69-72, wherein the FDD primary cell includes uplink and downlink component carriers (CCs).

74. The method of any of embodiments 1-18, 32-67 and 69-73, wherein the CCs are activated or deactivated as needed.

75. The method of any of embodiments 1-18, 32-07 and 69-74, wherein one of the CCs is deactivated between two time slots.

76. The method of any of embodiments 1-18, 32-67 and 69-76, wherein the CCs are in a downlink-only mode.

77. The method of any of embodiments 1-18, 32-67 and 69-76, wherein the CCs are in an uplink-only mode.

78. The method of any of embodiments 1-18, 32-67 and 69-77, wherein the CCs are in a shared mode.

79. A home evolved Node-B (HeNB) comprising a dynamic spectrum management (DSM) radio resource management (RRM) entity.

80. The HeNB of embodiment 79, further comprising a sensing toolbox configured to perform and process cognitive sensing on television white space (TVWS) and licensed exempt (LE) spectrum and reporting the results to the DSM RRM entity.

81. The HeNB of any of embodiments 79-80, further comprising a physical (PHY) layer.

82. The HeNB of any of embodiments 79-81, further comprising a medium access control (MAC) layer.

83. The HeNB of any of embodiments 79-82, further comprising a radio link control (RLC) layer.

84. The HeNB of any of embodiments 79-83, further comprising a packet data convergence protocol (PDCP) layer.

85. The HeNB of any of embodiments 79-84, further comprising a radio resource control (RRC) layer.

86. A wireless transmit/receive unit (WTRU) comprising a dynamic spectrum management (DSM) radio resource management (RRM) entity.

87. The WTRU of embodiment 86, further comprising a sensing toolbox configured to perform and process cognitive sensing on television white space (TVWS) and licensed exempt (LE) spectrum and reporting the results to the DSM RRM entity.

88. The WTRU of any of embodiments 86-87, further comprising a physical (PHY) layer.

89. The WTRU of any of embodiments 86-88, further comprising a medium access control (MAC) layer.

90. The WTRU of any of embodiments 86-89, further comprising a radio link control (RLC) layer.

91. The WTRU of any of embodiments 86-90, further comprising a radio resource control (RRC) layer.

92. A home evolved management system (HeMS) comprising a coexistence manager (CM) entity.

93. The HeMS of embodiment 91, further comprising an operator's coexistence database 94. The HeMS of any of embodiments 91-93, further comprising a plurality of policies, wherein the HeMS communicates with a television white space (TVWS) database via a coexistence discovery and information server (CDIS).

95. A method of aggregating carriers comprising aggregating licensed carriers with at least one supplementary component carrier of a primary cell, wherein a guard period between uplink and downlink transitions are altered based on a frequency of operation of the supplementary component carries.

96. An apparatus comprising a WTRU configured to perform any one of the above-specified methods.

97. A computer readable medium having instructions stored thereon that when executing by a WTRU cause the WTRU to perform any one of the above-specified methods.

98. A wireless receive/transmit unit (WTRU) configured to perform the method of any one of embodiments 1-18, 32-77 and 95.

99. The WTRU as in embodiment 98, further comprising a transceiver.

100. The WTRU as in any one of embodiments 98-99, further comprising a processor in communication with a transceiver.

101. The WTRU as in any one of embodiments 98-100, wherein a processor is configured to perform the method of any one of embodiments 1-18, 32-77 and 96.

102. A network node configured to perform the method of any one of embodiments 1-18, 32-77 and 95.

103. A Node-B configured to perform the method of any one of embodiments 1-18, 32-77 and 95.

104. An integrated circuit configured to perform any one of embodiments 1-18, 32-77 and 95.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method of carrier aggregation, comprising:
operating on a frequency division duplex (FDD) primary cell aggregated with a time division duplex (TDD) supplementary cell;
receiving a downlink (DL) transmission in a sub-frame (n);
determining a timing for hybrid automatic repeat request (HARQ) feedback for the DL transmission, wherein the HARQ feedback timing is set for a sub-frame (n+4); and
sending the HARQ feedback on the FDD primary cell based on the determined timing.

2. The method of claim 1, wherein the DL transmission is on the TDD supplementary cell.

3. The method of claim 1, wherein the DL transmission is on the FDD primary cell.

4. The method of claim 1, wherein the FDD primary cell operates on a licensed spectrum.

5. The method of claim 1, wherein the TDD supplementary cell operates on a licensed exempt (LE) spectrum.

6. The method of claim 1, further comprising sending positive acknowledgement (ACK)/negative acknowledgement (NACK) n+4 subframes following the DL transmission.

7. The method of claim 1, wherein the DL HARQ feedback is carried in a physical UL control channel (PUCCH).

8. The method of claim 7, wherein the PUCCH is on the FDD primary cell.

9. The method of claim 1, wherein multiple TDD supplementary cells are aggregated, each TDD supplementary cell being one of independently or dependently configured.

10. A wireless transmit/receive unit (WTRU), comprising:
a processor; and
a memory having stored instructions that when executed by the processor cause the WTRU to:
operate on a FDD primary cell aggregated with a TDD supplementary cell;
receive a DL transmission in a sub-frame (n);
determine a timing for HARQ feedback for the DL transmission, wherein the HARQ feedback timing is set for a sub-frame (n+4); and
send the HARQ feedback on the FDD primary cell based on the determined timing.

11. The WTRU of claim 10, wherein the DL transmission is on the TDD supplementary cell.

12. The WTRU of claim 10, wherein the DL transmission is on the FDD primary cell.

13. The WTRU of claim 10, wherein the FDD primary cell operates on a licensed spectrum and the TDD supplementary cell operates on a LE spectrum.

14. The WTRU of claim 10, wherein the WTRU sends an ACK/NACK n+4 subframes following the DL transmission.

15. The WTRU of claim 10, wherein the DL HARQ feedback is carried in a PUCCH.

16. The WTRU of claim 15, wherein the PUCCH is on the FDD primary cell.

17. A method of carrier aggregation, comprising:
operating on a FDD primary cell aggregated with a TDD supplementary cell;
sending an uplink (UL) transmission in a sub-frame (n);
determining a timing for hybrid automatic repeat request (HARQ) feedback for the UL transmission, wherein the HARQ feedback timing is set for a sub-frame (n+4);

receiving the HARQ feedback on the FDD primary cell; and associating the HARQ feedback with the UL transmission based on the determined timing.

18. The method of claim 17, wherein the UL transmission is on the TDD supplementary cell.

19. The method of claim 17, wherein the UL transmission is on the FDD primary cell.

20. The method of claim 17, wherein the FDD primary cell operates on a licensed spectrum.

21. The method of claim 17, wherein the TDD supplementary cell operates on a licensed exempt (LE) spectrum.

22. The method of claim 17, further comprising receiving an ACK/NACK n+4 subframes following the UL transmission.

23. The method of claim 17, wherein UL HARQ feedback is carried in a modified physical HARQ indicator channel (PHICH).

24. The method of claim 23, wherein the PHICH is carried on the primary cell.

25. The method of claim 17, wherein multiple TDD supplementary cells are aggregated, each TDD supplementary cell being one of independently or dependently configured.

26. The method of claim 17, wherein the primary cell or the TDD supplementary cell carries UL grant information.

* * * * *